United States Patent [19]

Jack et al.

[11] Patent Number: 5,119,465
[45] Date of Patent: Jun. 2, 1992

[54] SYSTEM FOR SELECTIVELY CONVERTING PLURALITY OF SOURCE DATA STRUCTURES THROUGH CORRESPONDING SOURCE INTERMEDIATE STRUCTURES, AND TARGET INTERMEDIATE STRUCTURES INTO SELECTED TARGET STRUCTURE

[75] Inventors: Martin L. Jack, Merrimac; Richard T. Gumbel, Windham, both of N.H.

[73] Assignee: Digital Equipment Corporation, Maynard, Mass.

[21] Appl. No.: 368,716

[22] Filed: Jun. 19, 1989

[51] Int. Cl.⁵ .......................... G06F 9/44; G06F 9/45
[52] U.S. Cl. .................. 395/500; 364/DIG. 1; 364/280.4; 364/283.2; 364/282.3
[58] Field of Search ... 364/200 MS File, 900 MS File

[56] References Cited

U.S. PATENT DOCUMENTS

| 4,667,290 | 5/1987 | Goss et al. | 364/200 |
| 4,751,740 | 6/1988 | Wright | 364/900 |
| 4,754,428 | 6/1988 | Schultz et al. | 364/900 |
| 4,791,558 | 12/1988 | Chaitin et al. | 364/200 |

OTHER PUBLICATIONS

Stephen Mallinson, "IBM Communications—Architectures and Directions," *Proceedings of the Int'l Conf. on Networking Technology and Architectures*, London, Jun. 1988, pp. 49–60.

Word Perfect for IBM Personal Computers and PC Networks, "Convert Program," Word Perfect Corporation, Orem, Utah (1990), pp. 91–99.

*Primary Examiner*—Thomas C. Lee
*Assistant Examiner*—L. Donaghue
*Attorney, Agent, or Firm*—Arnold, White & Durkee

[57] ABSTRACT

A data structure format conversion system comprising a front end converter, a back end converter, and a converter executive. The front end converter converts a source data structure in a source format to data in an intermediate format. The back end converter converts the data in the intermediate format to a target data structure in a target format. Finally, a converter executive controls the front end converter and back end converter to effect a conversion from the source data structure in the source format to the target data structure in the target format, through the intermediate format.

12 Claims, 14 Drawing Sheets

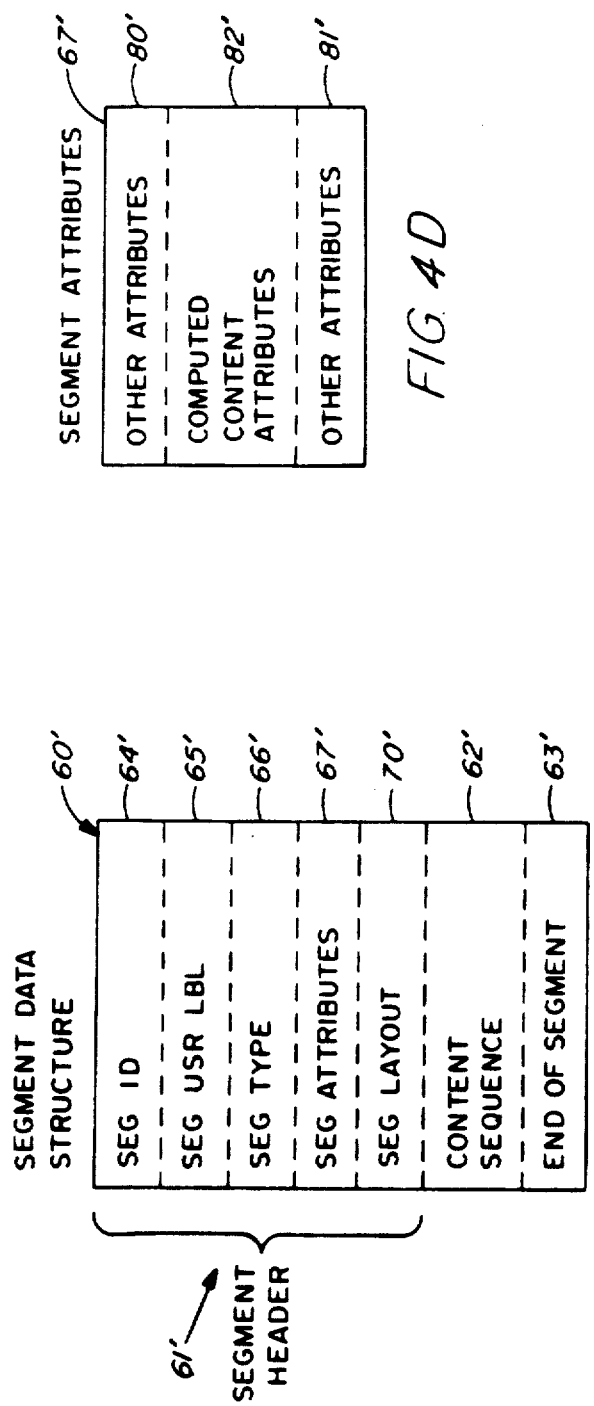

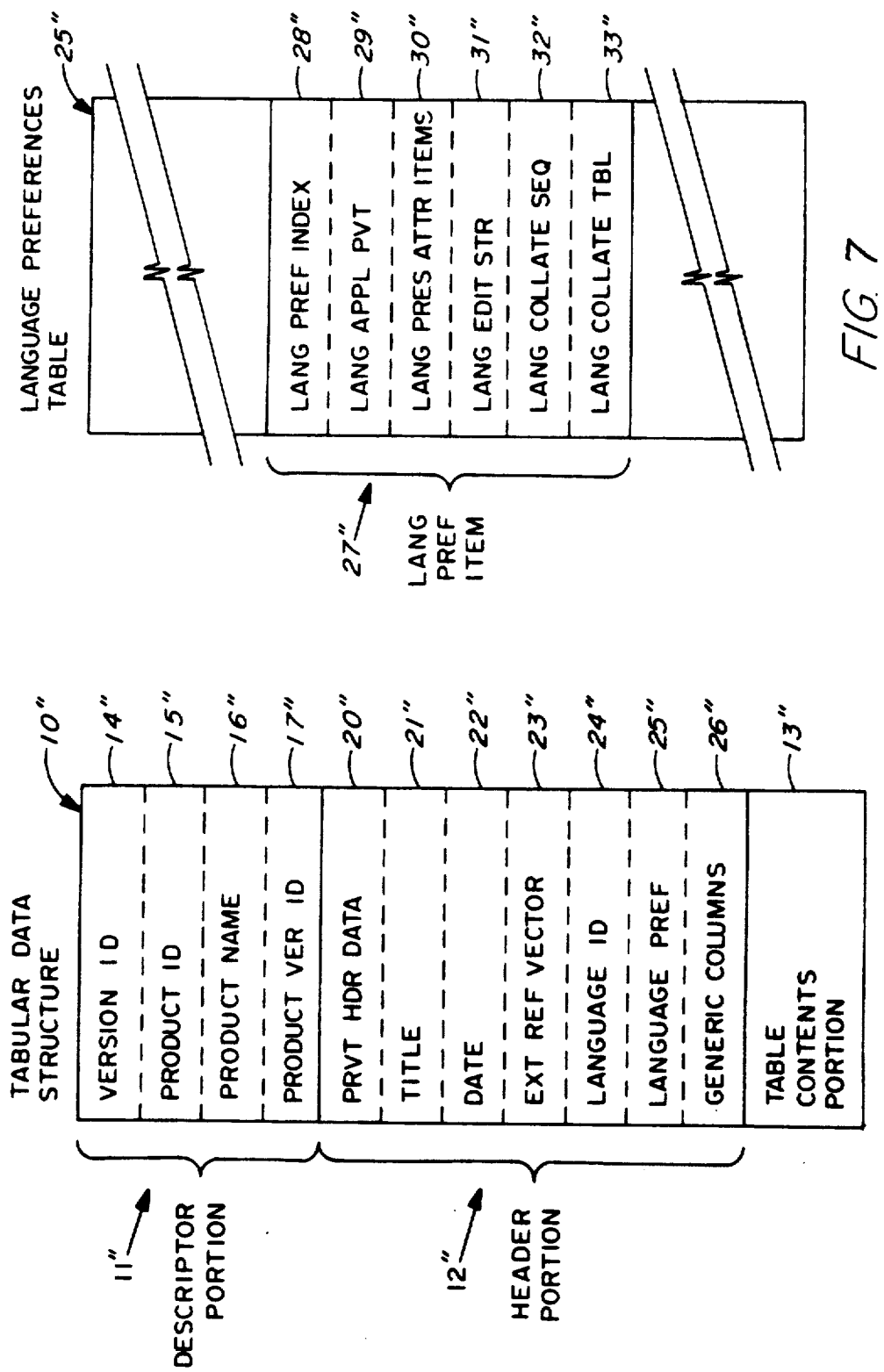

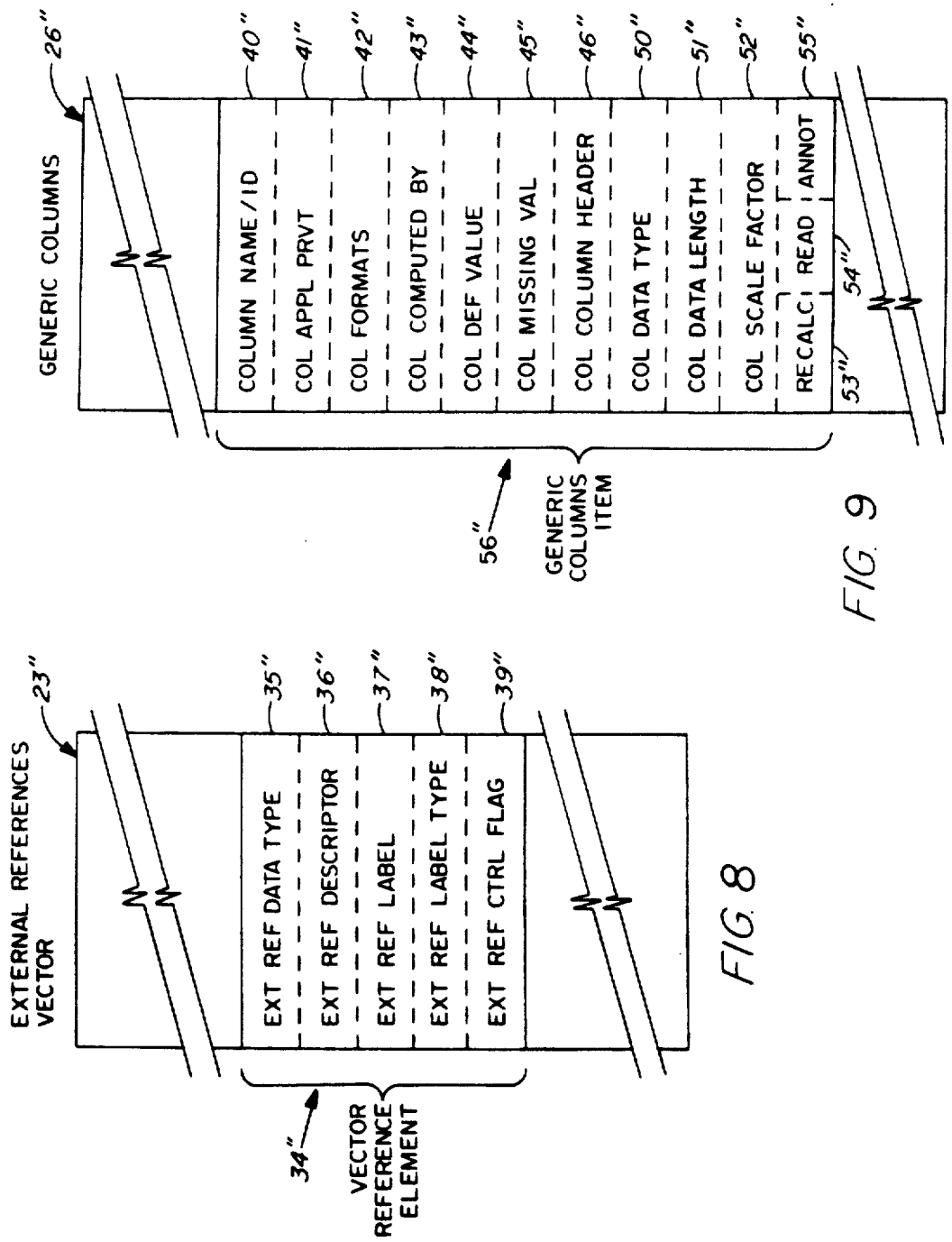

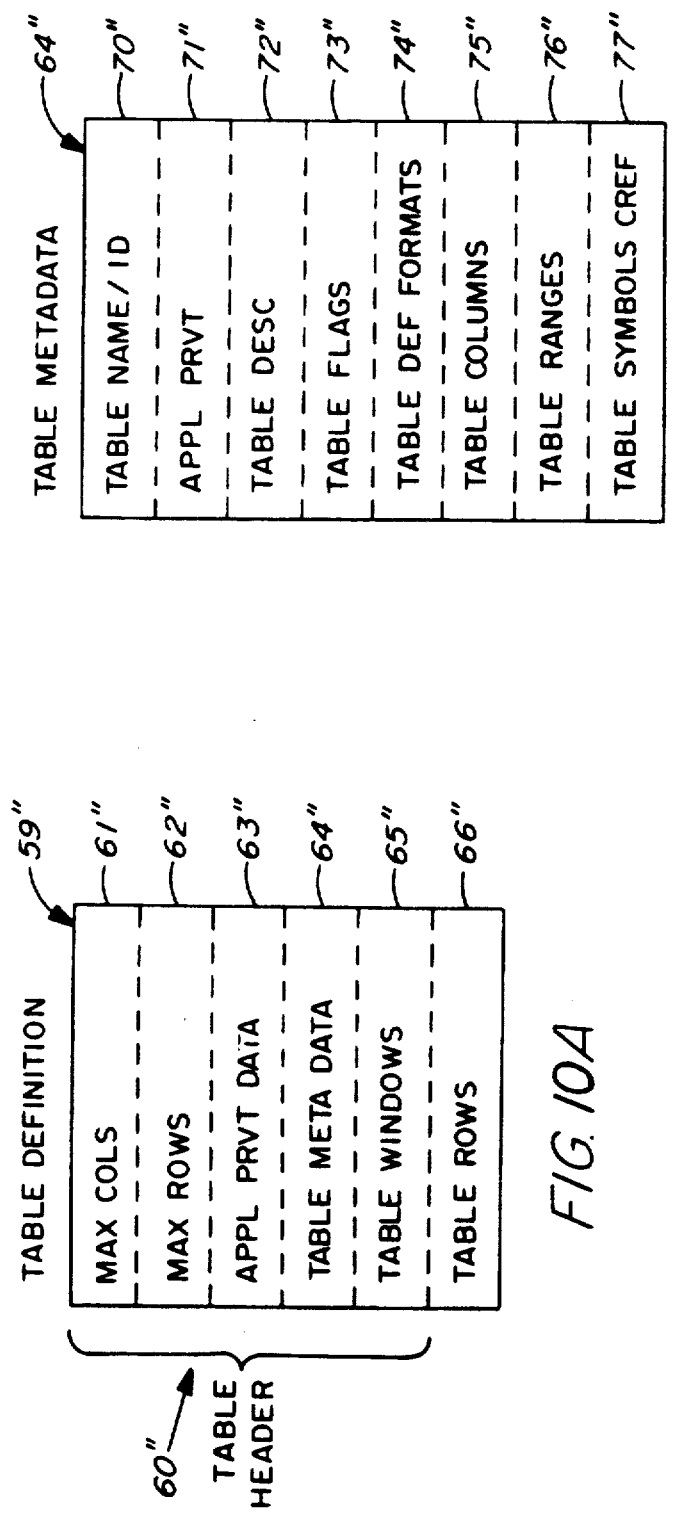

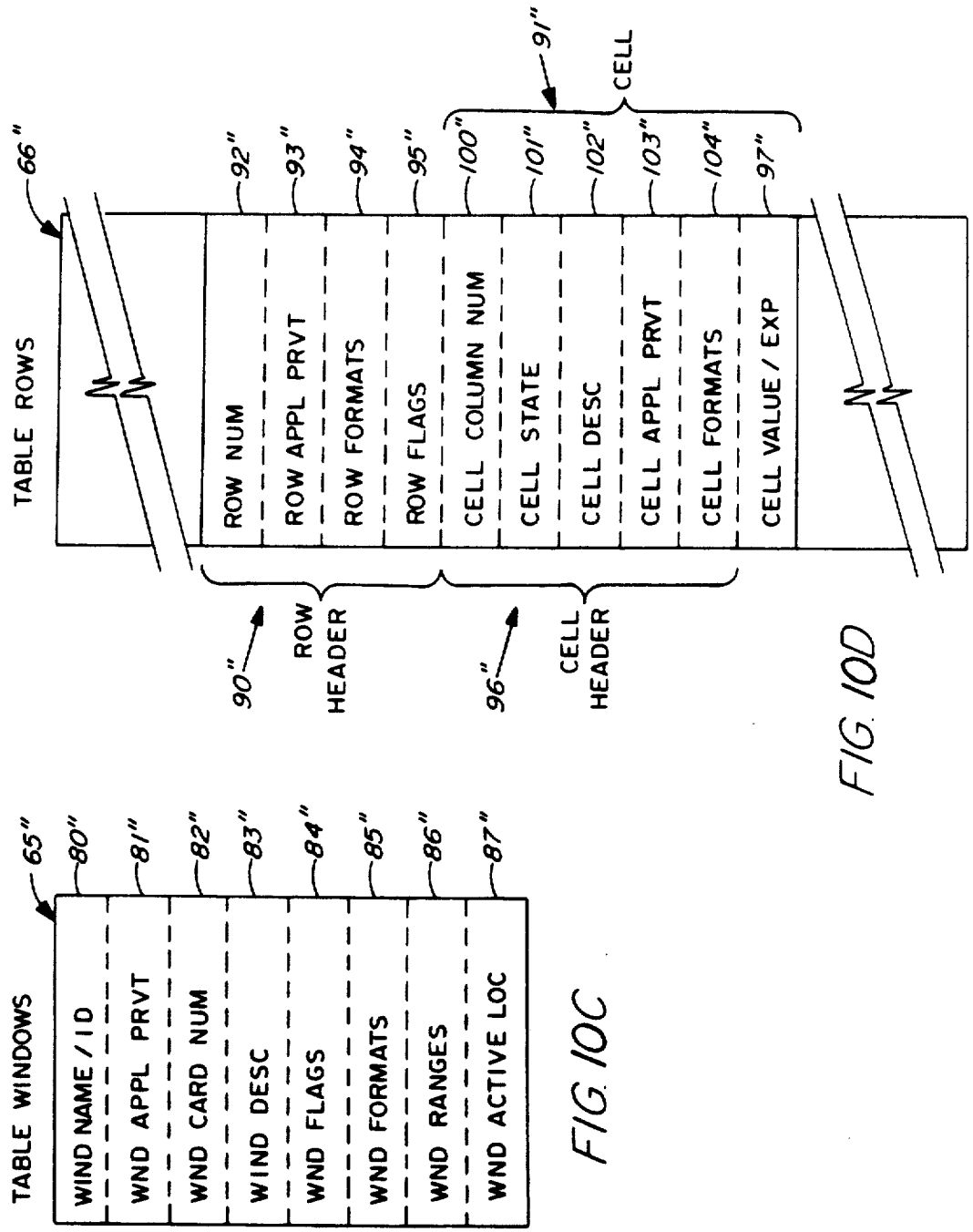

SYSTEM FOR SELECTIVELY CONVERTING PLURALITY OF SOURCE DATA STRUCTURES THROUGH CORRESPONDING SOURCE INTERMEDIATE STRUCTURES, AND TARGET INTERMEDIATE STRUCTURES INTO SELECTED TARGET STRUCTURE

INCORPORATION BY REFERENCE

U.S. patent application Ser. No. 07/368,703 filed Jun. 19, 1989, in the name of Robert L. Travis and William R. Laurune and entitled Data Structure Including External Reference Arrangement, which is incorporated herein by reference.

U.S. patent application Ser. No. 07/368,697, filed Jun. 19, 1989, in the name of Carol A. Young and Neal F. Jacobson and entitled Tabular Data Format, which is incorporated herein by reference.

FIELD OF THE INVENTION

The invention is directed generally to the field of digital computer systems and more particularly to arrangements for converting structures, such as file structures, from a source format to a target format.

BACKGROUND OF THE INVENTION

In a digital computer system, computer programs provided by a number of vendors typically organize data for processing in a number of diverse formats. Each vendor may use different formats for organizing the data processed by its programs, with the formats being selected to enhance the processing by the particular program. Some programs may also include conversion routines which allow the program to import data from files having selected formats to a format used by the program, and to export data from the format used by the program to another format.

Some document interchange formats have been proposed as standard formats for use by programs, and a number of programs support those formats at least to the extent that they convert data from the formats normally processed by them to one or more of the standard document interchange formats, thereby facilitating export of the data at least to the standard formats. In addition, typically the same programs will also convert data from the standard document interchange formats to the formats normally used by them, thereby facilitating import of the data at least from the standard formats.

SUMMARY OF THE INVENTION

In brief summary, the invention provides a data structure format conversion system comprising a front end converter, a back end converter, and a converter executive. The front end converter converts a source data structure in a source format to data for an intermediary. The back end converter converts the data from the intermediary to a target data structure in a target format. The intermediary includes a domain conversion arrangement comprising a source domain intermediate data structure for receiving data from the front end converter in the format provided by the front end converter, a target domain intermediate data structure for supplying data to the back end converter in the format required by the back end converter, and a domain converter for converting data from the format in the source domain intermediate data structure to the format for storage in the target domain intermediate data structure. Finally, a converter executive controls the front end converter and back end converter to effect a conversion from the source data structure in the source format to the target data structure in the target format, through the intermediate format.

In a further aspect, the invention provides a data structure format conversion system comprising a front end converter, a back end converter, and a converter executive. The front end converter converts a source data structure in a source format to data in an intermediate format. The back end converter converts the data in the intermediate format to a target data structure in a target format. Finally, a converter executive controls the front end converter and back end converter to effect a conversion from the source data structure in the source format to the target data structure in the target format, through the intermediate format. The converter executive selects the front end converter and the back end converter from a plurality of converters, each identified by a name identifying the respective formats converted thereby in response to the respective names. To accomplish that, the converter executive includes an intermediary selection portion for determining whether the format provided by a selected front end converter corresponds to the format required by a selected back end converter. An intermediate data structure portion responsive is to a positive determination by the intermediary selection portion for establishing an intermediate data structure to facilitate transfer of data in the intermediate format from the front end converter to the back end converter. Finally, a domain conversion portion responsive to a negative determination by the intermediary selection portion for establishing a domain conversion arrangement to facilitate conversion of data in the intermediate format provided by the front end converter to the intermediate format required by the back end converter.

In yet a further aspect, the invention provides a data structure format conversion system comprising a front end converter, a back end converter, and a converter executive. The front end converter converts a source data structure in a source format to data in an intermediate format. The back end converter converts the data in the intermediate format to a target data structure in a target format. Finally, a converter executive controls the front end converter and back end converter to effect a conversion from the source data structure in the source format to the target data structure in the target format, through the intermediate format. The front end converter and the back end converter operate iteratively in connection with sequential portions of the source data structure, the back end converter iteratively generating data requests which enable the converter executive to, in turn, enable the front end converter to perform a conversion operation in connection with a next sequential portion of the source data structure.

In yet a further aspect, the invention provides a data structure format conversion system comprising a front end converter, a back end converter, and a converter executive. The front end converter converts a source data structure in a source format to data in an intermediate format. The back end converter converts the data in the intermediate format to a target data structure in a target format. Finally, a converter executive controls the front end converter and back end converter to effect a conversion from the source data structure in the source format to the target data structure in the target format, through the intermediate format. The front end converter and the back end converter operate iteratively in connection with sequential portions of the source data structure, the back end converter iteratively generating data requests which enable the converter executive to, in turn, enable the front end converter to perform a conversion operation in connection with a next sequential portion of the source data structure. The back end converter further generates position requests, the converter executive enabling the front end converter to generate position information in response thereto for use by the back end converter.

In yet a further aspect, the invention provides a method of converting a data structure from a source structure to a target structure comprising the steps of converting a source data structure in a source format to data in a source domain intermediate data structure, converting the source domain intermediate data structure to a target domain intermediate data structure and converting the data in the target domain intermediate format to a target data structure in a target format.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIGS. 4A through 4D comprise diagrams depicting various aspects of the DOCUMENT intermediate data structure;

FIGS. 6 through 10D illustrate data structures, at various levels of detail, of a "TABULAR" intermediate data format.

DETAILED DESCRIPTION OF AN ILLUSTRATIVE EMBODIMENT

Figure 1:
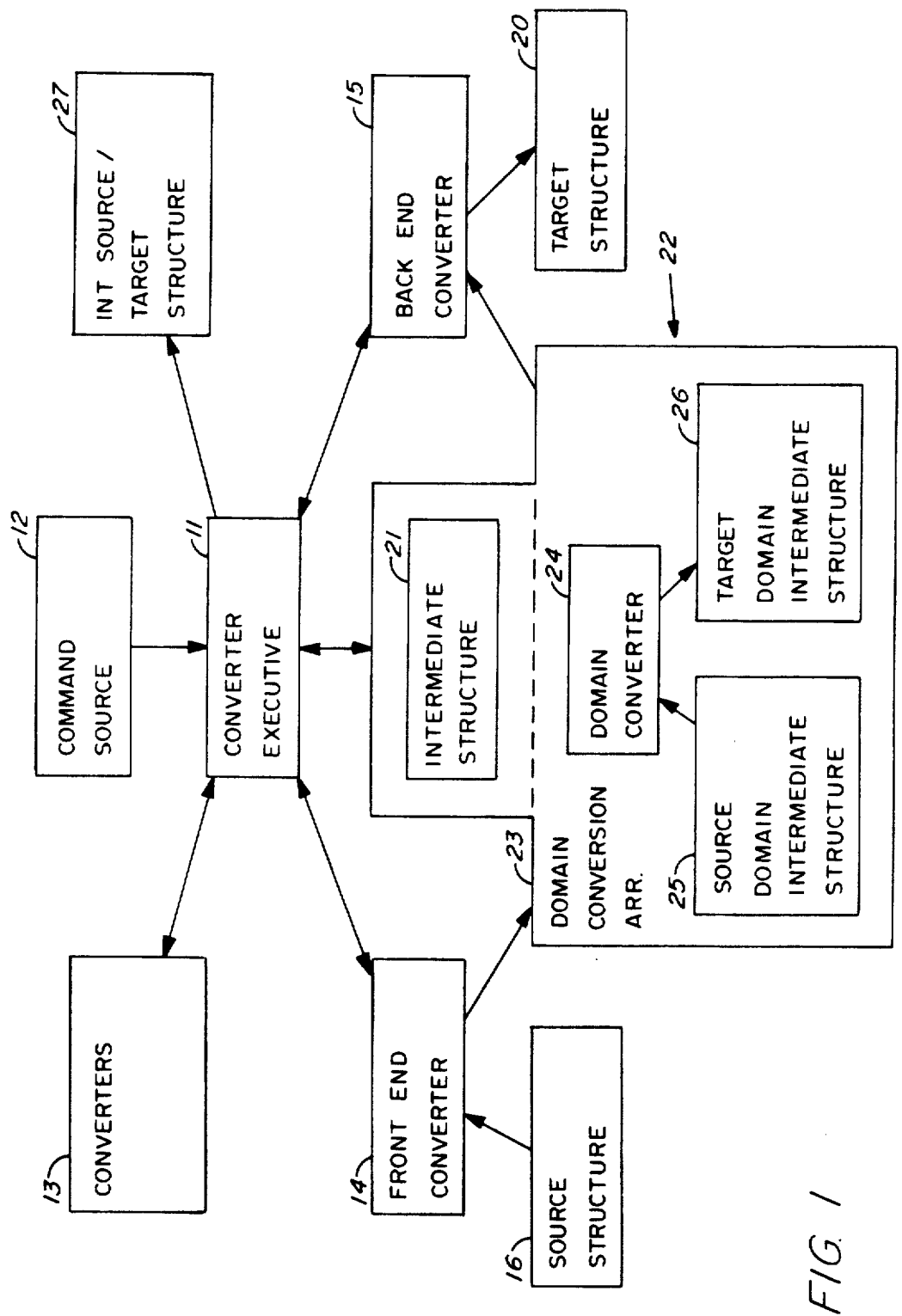
FIG. 1 depicts a functional block diagram of a conversion system, for use in connection with a digital computer system, constructed in accordance with the invention.

FIG. 1 depicts a functional block diagram of a data format conversion system 10, for use in connection with a digital computer system, constructed in accordance with the invention. With reference to FIG. 1, the conversion system 10 includes an executive converter 11 which receives a conversion command from a command source 12. The command source may comprise, for example, an operator input system, such as a video display terminal, through which the operator may enter a conversion command through the operating system command line. Alternatively, the command source 12 may comprise an applications program that requires a conversion from a source format to a target format.

A conversion command from command source 12 includes the identification of the source structure to be converted, the identification of the destination structure to be created, and also the source format and the target format. The data format conversion system 10 includes a plurality of converters stored in a converter store 13, which may be located in a known location in the digital computer system, such as one or more directories in a disk storage system (not shown). Each converter in converter store 13 converts data between a source structure and one of a plurality of known intermediate formats, such as, for example, formats identified as DOCUMENT and TABULAR formats, or between one of the intermediate formats and a target format. In response to the conversion command, the converter executive 11 selects one or two converters, as described below, with one of the selected converters comprising a front end converter 14 and the other comprising a back end converter 15.

The details of one embodiment of the illustrative DOCUMENT format are described in U.S. patent application Ser. No. 07/368,703, filed on even date herewith, in the name of Robert L. Travis and William R. Laurune and entitled Data Structure Including External Reference Arrangement, which is incorporated herein by reference, and the details of the illustrative TABULAR format are described in U.S. patent application Ser. No. 07/368,697, filed on even date herewith, in the name of Carol A. Young and Neal F. Jacobson and entitled Tabular Data Format, which is also incorporated herein by reference.

The front end converter 14, selected by the converter executive 11, converts source data structure 16 to an output data structure for an intermediary 17, and the back end converter 15, selected by the converter executive 11, converts a data structure from the intermediary 17 to a target data structure 20. The source data structure 16 and the target data structure 20 may comprise in-memory data structures, or they may be data structures stored in files on disk or other non-volatile mass storage.

The intermediary 17 may take one of two forms. If the front end converter 14 selected by the converter executive 11 generates an output data structure having the same intermediate format as that used by the back end converter 15 as its input, the converter executive 11 uses an intermediate data structure 21 as its intermediary 17. For example, if the front end converter 14 generates an output data structure having the DOCUMENT format, and the back end converter 15 uses an input data structure having the DOCUMENT format, both of them use the intermediate data structure 21 as the intermediary 17. Similarly, if the front end converter 14 generates an output data structure having the TABULAR format, and the back end converter 15 uses data in the TABULAR format as its input, both of them use the intermediate data structure 21 as the intermediary. The intermediate data structure 21 may be an in-memory data structure, or a data structure stored in files on disk or other non-volatile mass storage.

On the other hand, if the front end converter 14 generates an output data structure which has a different format than the format required by the back end converter 15 for its input data structure, the converter executive 11 uses a domain conversion arrangement 23 as the intermediary 17. The domain conversion arrangement 23 changes the format of the data structure produced by the front end converter 14 to the format of the data structure for use by the back end converter 15. The domain conversion arrangement 23 includes a domain converter 24 that obtains data from a source domain intermediate data structure 25, which receives output data from the front end converter 14, and generates in response thereto a target domain intermediate data structure 26, which provides input data to the back end converter 15. The back end converter 15 uses the data in the target domain intermediate data structure 26 in its conversion operation. Using the illustrative DOCUMENT and TABULAR formats, if the front end converter 14 generates data in the source domain intermediate data structure 25 that is in the DOCUMENT format, the domain converter 24 converts the data in the source domain intermediate data structure 25 from the DOCUMENT format to the TABULAR format for the target domain intermediate data structure 26. Similarly, if the front end converter 14 generates data in the source domain intermediate data structure 25 that is in the TABULAR format, the domain converter 24 converts the data in the source domain intermediate data structure 25 from the TABULAR format to the DOCUMENT format for the target domain intermediate data structure 26.

One specific embodiment includes a domain converter 24 which converts from the DOCUMENT format to the TABULAR format, and another domain converter which converts from the TABULAR format to the DOCUMENT format. In that embodiment, the domain converters may be stored in the converters store 13 along with the various format converters and selected by the converter executive 11 when necessary as described below.

The format conversion system 10 also includes an intermediate source/target structure 27, which may comprise a target for data from the front end converter 14 if the conversion command from the converter executive 11 specifies a converted format comprising either the DOCUMENT or the TABULAR format. In that case, the data output from the front end converter 14, or the domain conversion arrangement 23, is in the format specified by format conversion command provided by the command source 12, and so the converter executive 11 does not need to locate a back end converter 15 to form the required output format.

Similarly, the intermediate source/target structure 27 may comprise a source for data for the back end converter 15, either directly or following domain conversion by the domain conversion arrangement 23, if the conversion command provided to the converter executive 11 specifies input data formatted in either the DOCUMENT or the TABULAR format. In that case, if the back end converter 15 can use, as its input, data that is formatted as specified in the conversion command, the converter executive 11 can enable the back end converter 15 to use the data from the intermediate source/target structure 27 directly. On the other hand, if the back end converter 15 requires data in the other of the DOCUMENT or TABULAR formats than that specified in the conversion command received by the converter executive 11, the converter executive 11 enables the domain conversion arrangement 23 to perform a domain conversion operation to convert the format of the data in the intermediate source/target structure 27 for use by the back end converter 15.

Figure 2A:
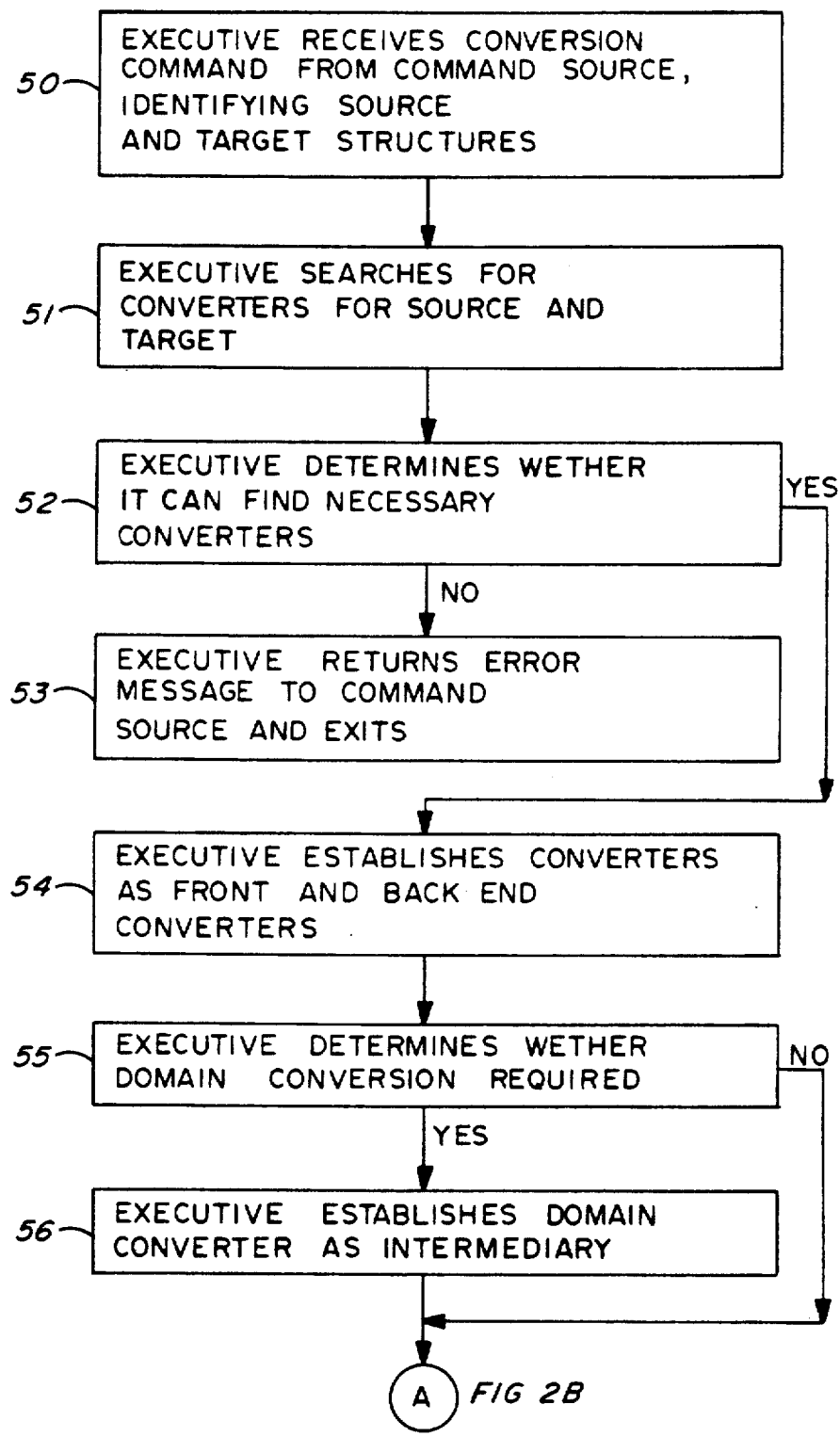
FIGS. 2A through 2D depict flow diagrams illustrating the operation of the conversion system depicted in FIG. 1.

The operations performed by the various elements depicted in FIG. 1 will be described in detail in connection with FIGS. 2A through 2D. With reference to FIG. 2A, the converter executive 11 first receives a conversion command from the command source 12 (step 50). The conversion command identifies the formats of the source data structure 16 and target data structure 20 as well as the identification of the file or other source for the source data structure 16, and the identification of the file or other sink for the target data structure 20.

After receiving the conversion command, the converter executive 11 searches for converters in converter store 13 that are satisfactory for converting from the source format to the target format (step 51). In one embodiment, the converters all have predetermined name formats identifying them as either front end converters or back end converters, and identifying the input and output formats for which they are compatible. That is, the front end converters all have a name format DOCUMENT$READ_<SRC_FORM> or TABULAR$READ_<SRC_FORM> (where "<SRC_FORM>" represents a format name, that is, the name of the format of the data structure to be converted, namely, the source structure 16). A front end converter 14 with a name DOCUMENT$READ_<SRC_FORM> performs a format conversion operation between a source format identified by <SRC_FORM> and the DOCUMENT format, and a front end converter 14 with a name TABULAR$READ_<SRC_FORM> performs a format conversion operation between a source format identified by <SRC_FORM> and the TABULAR format. Similarly, the back end converters 15 all have a name format DOCUMENT$WRITE_<TGT_FORM> or TABULAR$WRITE_<TGT_FORM> (where "<TGT_FORM>" represents a format name, that is, the name of the format of the data structure to be created by the conversion, namely, target structure 20), with a back end converter 15 with a name DOCUMENT$WRITE_<TGT_FORM> performing a format conversion operation between the DOCUMENT format and a target format identified by <TGT_FORM>, and a back end converter 15 with a name TABULAR$READ_<TGT_FORM> performing a format conversion operation between the TABULAR format and a target format identified by <TGT_FORM>.

Thus, in that embodiment, in performing step 51, the converter executive 11 searches for converters in converter store 13 which identify the source format <SRC_FORM> and target format <TGT_FORM> which correspond to the source format and target format identified in the conversion command from the command source 12. If it cannot find the necessary converters (step 52), it sequences to step 53 to return an error message to the command source 12, and then exits.

On the other hand, if the converter executive 11, in step 52, determines that it has found the necessary converters from converter store 13, it sequences to step 54 to establish the located converters as a front end converter 14 and a back end converter 15. Thereafter, the converter executive 11 determines whether a domain conversion is required (step 55). If the front end converter 14 and back end converter 15 established by the converter executive 11 in step 54 identify different domains, that is, if the front end converter 14 contains DOCUMENT in its name while the back end converter 15 contains TABULAR in its name, or if the front end converter 14 contains TABULAR in its name while the back end converter 15 contains DOCUMENT in its name, a domain conversion is required, and the converter executive 11 establishes the domain conversion arrangement 23 as the intermediary 17 (step 56). However, if the converter executive 11 determines in step 55 that both the front end converter 14 and the back end converter 15 have DOCUMENT in their names, or if it determines that both have TABULAR in their names, it establishes in step 55 the intermediate data structure as the intermediary 17.

In step 56, the converter executive 11 operates to select a domain converter 24 for use in domain conversion arrangement 23 in substantially the same manner as it selects front and back end converters as described above. That is, in one embodiment, a domain converter for converting from the DOCUMENT format to the TABULAR format is named $DOCUMENT_TO_TABULAR and a domain converter for converting from the TABULAR format to the DOCUMENT format is named $TABULAR_TO_DOCUMENT. In that embodiment, if the converter executive 11, in selecting a front end converter 14 from the converter store 13, can only locate a front end converter that has the name DOCUMENT$READ_<SRC_FORM>, which converts from the format <SRC_FORM> to the DOCUMENT format, and a back end converter that has the name TABULAR$WRITE_<TGT_FORM>, which converts from the TABULAR format to the format <TGT_FORM>, then the converter 11 selects a domain converter having the name $DOCUMENT_TO_TABULAR, which converts from the DOCUMENT format generated by the front end converter 14, to the TABULAR format required by the back end converter 15. Conversely, if the converter executive 11, in selecting a front end converter 14 from the converter store 13, can only locate a front end converter that has the name TABULARSREAD_<SRC_FORM>, which converts from the format <SRC_FORM> to the TABULAR format, and a back end converter that has the name DOCUMENT$WRITE_<TGT_FORM>, which converts from the DOCUMENT format to the format <TGT_FORM>, then the converter 11 selects a domain converter having the name $TABULAR_TO_DOCUMENT, which converts from the TABULAR format generated by the front end converter 14, to the DOCUMENT format required by the back end converter 15.

Thereafter, the converter executive 11 sequences to step 57 (FIG. 2B) to call the front end converter 14, along with the name of the source structure 16 to be converted. The call may be by any conventional inter-process or inter-procedure call mechanism. The front end converter 14 receives the call, initializes itself in a conventional manner (step 60) and then opens the identified source structure (step 61). Thereafter, the front end converter 14 creates a root aggregate for the identified source structure (step 62). In this operation, the front end converter 14 allocates a portion of its memory space for the source structure 16 identified in the call from the converter executive 11, and inserts there into selected context information, including pointers to major portions of the source data structure 16, in particular, pointers to a descriptor portion, a header portion, and a content portion. The front end converter 14 then returns control to the converter executive 11, along with a pointer, identified as the root aggregate handle, to the just-created root aggregate (step 63). Subsequent communications between the converter executive 11 and the front end converter 14 regarding the conversion of the source data structure 16 include the root aggregate handle to identify the communications as relating to that conversion.

When the front end converter 14 returns control to the converter executive 11 (step 63), the converter executive 11 calls the back end converter 15, identifying the front end converter 14 and the root aggregate handle (step 64). As with the call to the front end converter 14 in step 57, the call to the back end converter 15 may be made by means of any conventional inter-process or inter-procedure call mechanism. The back end converter 15 then initializes itself (step 65) and calls the converter executive 11 for a conversion operation, the call identifying the root aggregate handle and the front end converter 14 (step 66). The converter executive 11, in turn, calls the front end converter 14 identified in the call from the back end converter 15, identifying the root aggregate handle (step 67).

Upon receiving the call from the converter executive 11, the front end converter 14 performs a conversion operation in connection with the source data structure 16 to generate an intermediate aggregate. In this operation, the converter executive 11 may convert the entire source data structure 16, or only a portion thereof, sufficient to provide at least one aggregate in the intermediate format produced by the front end converter 14. An aggregate is a manageable portion of the intermediate format, which is associated with a data type. For example, in the DOCUMENT format described in the aforementioned Document Data Format patent application, aggregate types include such categories as the document descriptor, document header, document segment beginning and end, and various types of document content, including text, directives, Bezier curves, lines, arcs, references to external information, and so forth. Similarly, in the TABULAR format described in the aforementioned Tabular Data Format patent application, aggregate types include such categories as the descriptor, header, and tables.

The front end converter 14, while performing its conversion operation, iteratively generates, from the source data structure 16, sufficient information from the source data structure 16 to produce at least one aggregate. The specific details of the conversion operation depend on the format of the source data structure 16 and the particular intermediate format comprising the output of the front end converter 14. If the front end converter 14 loads an entire source data structure 16 into memory for processing, it converts the entire source data structure 16 at that point, iteratively producing aggregates and passing them to the converter executive 11 for storage in either the intermediate data structure 21 or the source domain intermediate data structure 25, depending on whether the converter executive 11 determined that a domain conversion was required.

On the other hand, if the front end converter 14 does not load the entire source data structure 16 into memory it converts only an aggregate at a time, upon request from the converter executive 11, beginning with the header, and descriptor aggregates and proceeding sequentially through the source data structure 16 for the remaining portions thereof. In addition, the front end converter 14 provides to the converter executive 11 status information regarding the status of the conversion along with the converted aggregate, in particular indicating when it has completed conversion of the entire source data structure 16.

Following the conversion of either the entire source data structure 16 or an aggregate (step 70), front end converter 14 returns control to the converter executive 11. The converter executive 11 then determines whether a domain conversion is required (step 71), and if so calls the domain converter 24 to perform the conversion in connection with the source domain intermediate data structure 25 to form the target domain intermediate data structure 26 (step 72). This occurs if the converter executive 11 has previously established the domain conversion arrangement 23 as the intermediary 17. Following step 72, or step 71 if the converter executive 11 determines that domain conversion is not necessary, the converter executive 11 calls the back end (step 73).

Upon receiving the call from the converter executive 11 (step 73), the back end converter 15 determines whether the information provided by the intermediary 17, comprising either the intermediate data structure 21 or the target domain intermediate data structure 26, indicates that the entire source data structure 16 has been converted (step 74). This occurs if the front end converter 14 has notified the converter executive 11, in the call in step 70, that it has completed conversion of the entire source data structure 16 as indicated above. If not, the back end converter 15 sequences to step 75 to perform a conversion of the aggregate in either the intermediate data structure 21 or the target domain intermediate data structure 26 from the intermediate format to form the target data structure 20. As with the front end converter 14 noted above, the specific operations performed by the back end converter 15 in performing the conversion will depend on the intermediate format and the specific format of the target data structure 20. After performing the conversion on the aggregate provided by the intermediary 17, the back end converter 15 returns to step 66 to request the next aggregate from the converter executive 11.

If the back end converter 15 determines, in step 74, that the entire source data structure 16 has been converted, it sequences to step 76 to close the target data structure 20. In this operation, the back end converter 15 may, if necessary, write the target data structure 20 to a disk file, and eliminate any in-memory data structures which it used for performing the format conversion to the target format. Thereafter, the back end converter 15 calls the converter executive 11, indicating completion of the conversion operation (step 76), after which it exits.

Figure 2B:
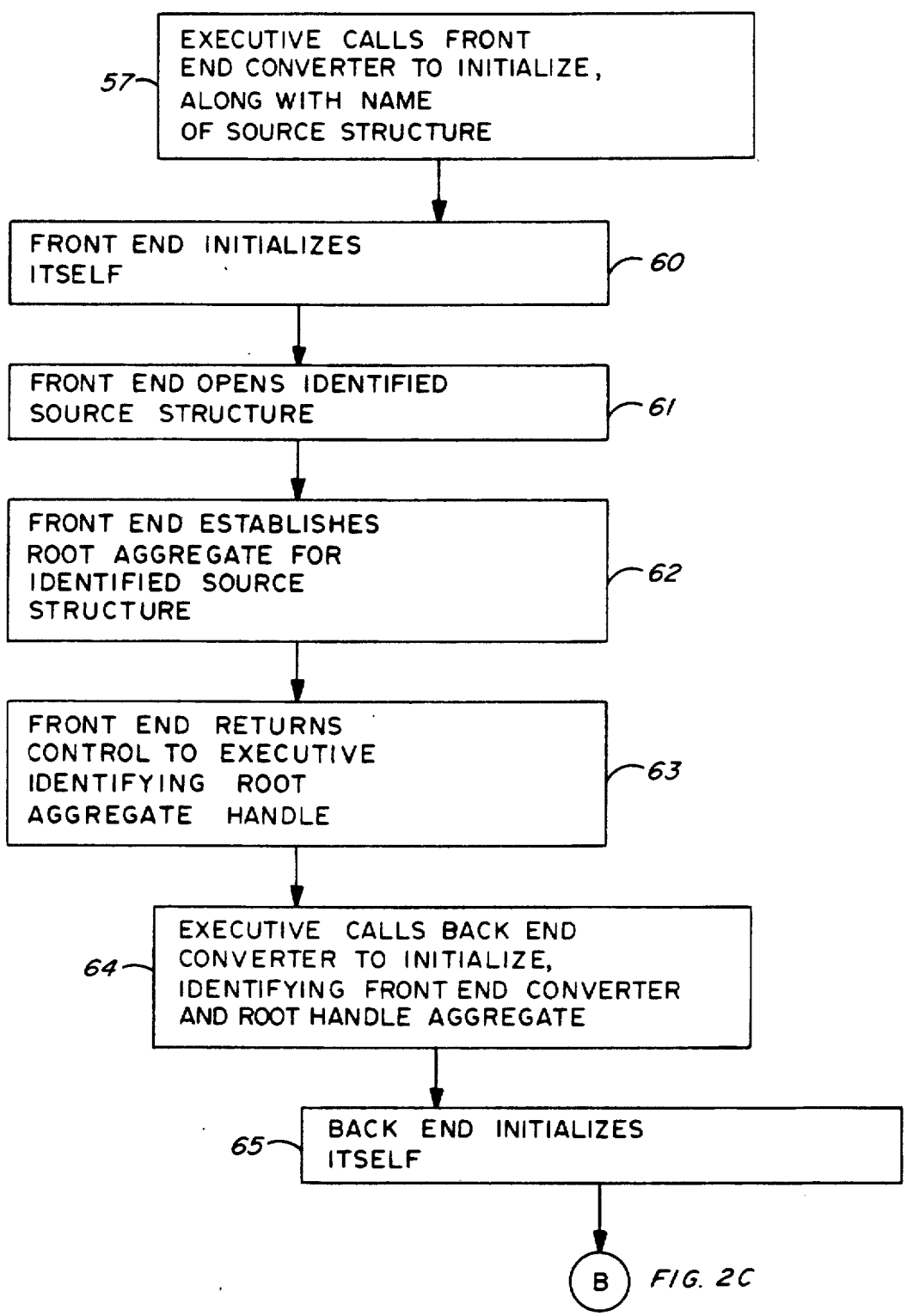
Figure 2C:
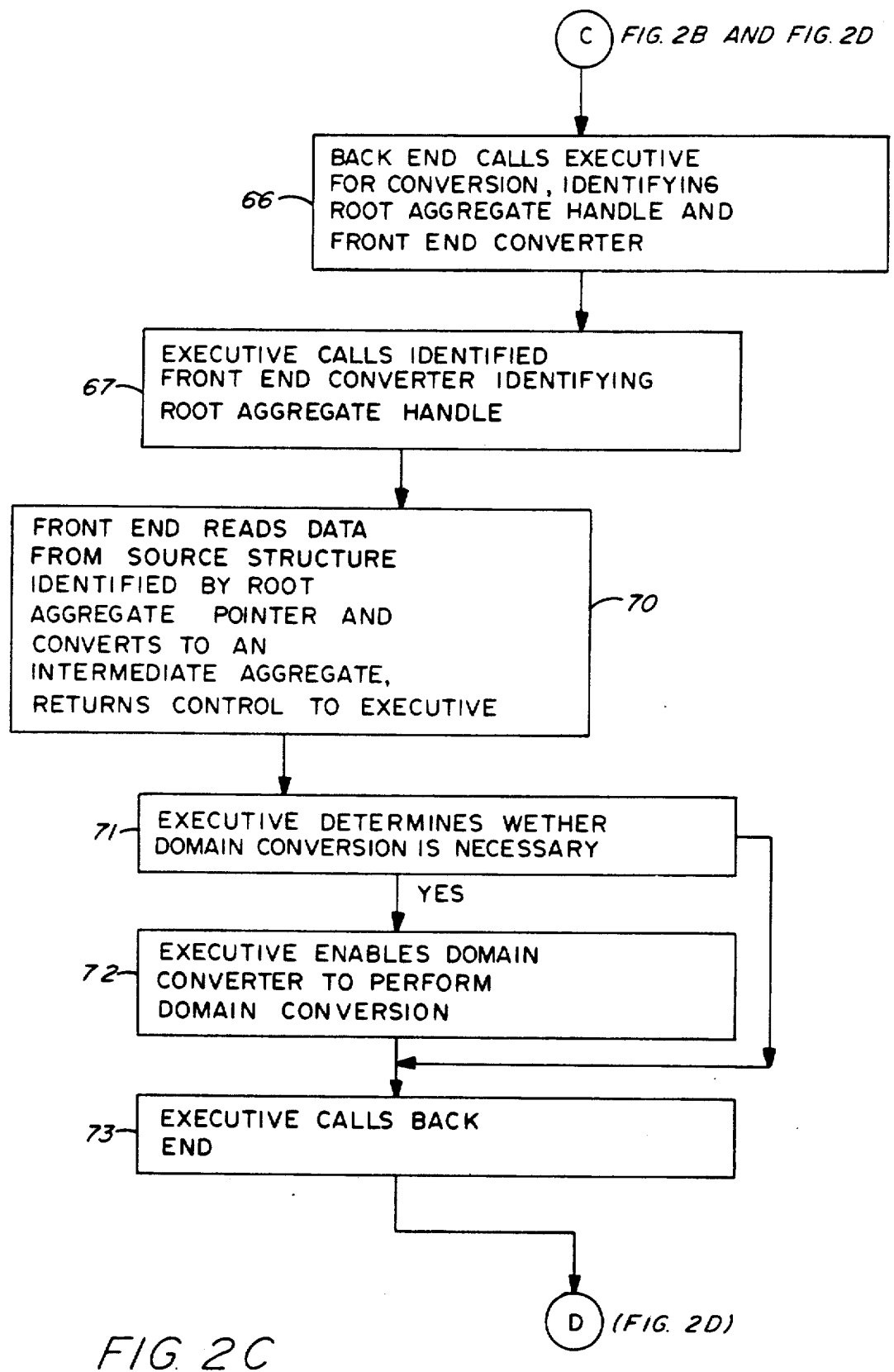
Figure 2D:
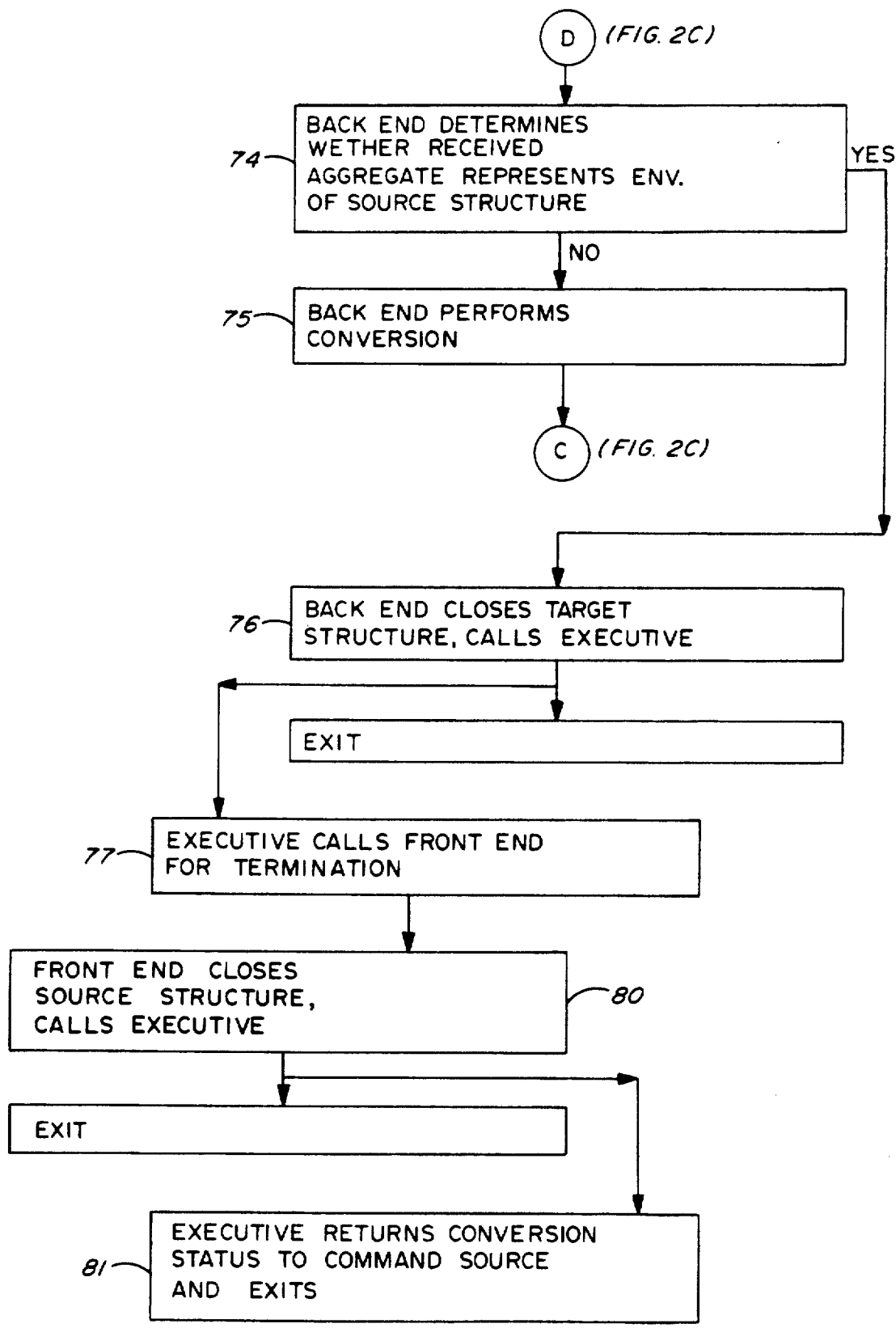

In response to notification from the back end converter 15 that the conversion operation has been completed, the converter executive 11 calls the front end converter 14, indicating that the conversion operation has been completed (step 77). The front end converter 14 also closes the source data structure 16 (step 80), and eliminates in-memory data structures which it used during the conversion, including the root aggregate established during step 62 (FIG. 2B). The front end converter 14 then, exits, returning control to the converter executive 11. The converter executive 11 then returns the conversion status and the identification of the target data structure 20 to the command source 12, after which it exits, thereby completing the conversion operation.

It will be appreciated that, if the conversion command from the command source 12 indicates that the format of the source data is in either the DOCUMENT format or the TABULAR format, the converter executive 11 does not, in step 51, need to search for a front end converter 14, but instead uses the intermediate source/target data structure 27 as the source of the data to be converted. The converter executive 11 operates, in conjunction with the back end converter 15, as a front end converter to the extent that it converts either the entire intermediate source/target data structure 27, if it can load it into memory, or an aggregate at a time on request from the back end converter 15 as described above. In addition, the converter executive 11 uses the particular intermediary 17 as required by the format of the intermediate source/target data structure 27 and the input format of required by the back end converter 15. That is, if the format of the intermediate source/target data structure 27 is the same as that required by the back end converter 15 as its input, the converter executive 11 uses the intermediate data structure 21 as the intermediary 17. On the other hand, if the format of the intermediate source/target data structure 27 differs from that required by the back end converter 15 as its input, the converter executive 11 uses the domain conversion arrangement 23 to perform the required domain conversion.

Similarly, if the conversion command from the command source 12 indicates that the format of the target data is in either the DOCUMENT format or the TABULAR format, the converter executive 11 does not, in step 51, need to search for a back end converter 15, but instead uses the intermediate source/target data structure 27 as the target of the data that was converted. The converter executive 11 operates, in conjunction with the front end converter 14, as a back end converter to the extent that it receives the output from the front end converter 14 as the intermediate source/target data structure 27, if it is in the proper DOCUMENT or TABULAR format as required by the conversion command. However, if the output of the front end converter 14 is not in the format required by the conversion command, the converter executive 11 enables the domain conversion arrangement 23 to perform the required domain conversion to produce the intermediate source/target data structure 27.

With this background, the operations of a front end converter 14 and a back end converter 15 will now be generally described. A front end converter 14 comprises a procedure which essentially has four entry points, including a main calling entry point, which the converter executive 11 uses to initially call the front end converter 14 (in step 57, FIG. 2B), a GET_AGGREGATE entry point, a GET_POSITION entry point, and a CLOSE entry point. The main calling point is identified by the front end converter's name, as described above, and enables the converter executive 11 and front end converter 14 to establish a context, pass the identification of the source data structure 16, establish various processing options, and enable the front end converter 14 to return pointers to the other entry points. In calling the front end converter 14 through the main entry point, the converter executive 11 supplies a converter context value and a pointer to a location in which the front end converter 14 may insert a returned context value which is used in subsequent call operations through the GET_AGGREGATE, GET_POSITION and CLOSE entry points as described below. This front end converter-supplied context value is used to disambiguate conversion operations if the front end converter 14 is being used to convert multiple source data structures 16 contemporaneously. The converter executive 11 also supplies pointers to locations in which the called front end converter 14 can supply the pointers to the GET_AGGREGATE, GET_POSITION and CLOSE entry points. In response to a call through its main entry point, as described above the front end converter 14 allocates memory space for the source data structure 16, or at least a portion thereof, in a conventional manner.

The GET_AGGREGATE entry point is used by the converter executive 11 (in step 67 FIG. 2C) to enable the front end converter 14 to provide the next aggregate during an incremental conversion operation. In calling through this entry point, the converter executive 11 identifies the context value supplied by the front end converter 14 in response to the call through the main entry point (step 57), a pointer to a buffer to receive the aggregate, and a pointer to a location to receive an identification of the type of aggregate. The buffer comprises a location of the intermediary 17, and in particular may comprise the intermediate data structure 21 if the converter executive 11 determined (in step 55, FIG. 2A) that no domain conversion is required, or the source domain intermediate data structure 25 if the converter executive 11 determined that domain conversion is required.

The front end converter 14 uses the context value to identify the particular source data structure 16 being converted, and it sequentially converts the aggregates comprising the source data structure 16 in order. Upon performing the conversion of the first unconverted aggregate into the source data structure 16, the front end converter 14 loads the converted aggregate into the buffer identified by the buffer pointer, and an aggregate type value into the location identified by the aggregate type pointer. As noted above, the particular operations performed by the front end converter 14 in response to a call through this entry point depend on the format of the source data structure 16 and the output format as specified in the converter's name.

The GET_POSITION entry point is used by the converter executive 11 to enable the front end converter 14 to provide information as to the amount of the source data structure 16 which has been converted. This information may be requested by the converter executive 11 if it displays the contents of the intermediate source/target data structure 27 or by a back end converter 15 which displays the contents of the target data structure 20 so that it may provide an accurate placement of a slider in a scroll bar, the placement indicating the location of the displayed portion of the respective data structure within an entire converted data structure 20 or 27. The front end converter 14 may maintain a running counter of the amount of the source data structure 16 it has converted.

The converter executive 11 supplies, during a call through the GET_POSITION entry point, an identifier for the source data structure 16, and pointers to locations into which the front end converter 14 inserts a stream position value and a stream size value. The stream position value identifies the amount of the source data structure 16 converted to that point by the front end converter 14, and the stream size value identifies the total size of the source data structure 16. These two values are used to identify the percentage of the source data structure 16 converted.

In calling the front end converter 14 through the CLOSE entry point, the converter executive 11 supplies the context value previously supplied by the front end converter 14 to identify the conversion operation for the source data structure 16. The CLOSE entry point is called by the converter executive 11 to enable the front end converter 14 to close the source data structure 16, which occurs in a conventional manner, and exit, returning control to the converter executive 11 (in step 80, FIG. 2D).

As described above in connection with FIGS. 2C and 2D, after the back end converter 15 has been called and initiated, the iterative conversions of the sequential aggregates from the source data structure 16 are initiated by the back end converter 15. Since the conversion is essentially driven and controlled by the back end converter 15, the back end converter 15 only has a single entry point, namely, the main entry point identified by the converter's name. The converter executive 11, in calling the back end converter 15 through its main entry point, supplies a pointer to the front end converter to perform the conversion, and a pointer to a location in which the back end converter 15 can insert a context value. The context value is used by the converter executive 11 in returning converted aggregates to the back end converter 15. As noted above, in connection with the front end converter 14, the particular operations performed by the back end converter 15 in connection with its conversion operations depend on the format of the data structure provided by the intermediary 17 and the format for the target data structure 20.

The invention thus provides a system for converting data between a source data structure and a target data structure of differing formats through an intermediary, which may itself perform a conversion between diverse domains. In addition, the invention provides an extensible conversion system, in which converters may be easily added and located by a converter executive as needed, in response to conversion commands from a command source.

As noted above, the particular operations performed by a front end converter 14, back end converter 15 and a domain converter 24, in performing the respective conversions, will depend upon the formats of the data in the respective input data structures (that is, source structure 16 for front end converter 14, source domain intermediate structure 25 for domain converter 24, and target domain intermediate structure 26 for back end converter 15) and the formats of the data to be produced by the respective converters. A general description of a conversion operation from the TABULAR format to the DOCUMENT format will illustrate how the conversion operation can be accomplished.

Before describing the conversion operation, it will be helpful to generally describe both the DOCUMENT format and the TABULAR format. The DOCUMENT format is more specifically described in the aforementioned Travis, et al., application and the TABULAR format is more specifically described in the aforementioned Young, et al., application, both of which are incorporated herein by reference. A data structure in the DOCUMENT format includes a descriptor portion, a header portion, both of which contain various identification and status information, and a content portion which stores data representing a document in a plurality of hierarchically-organized segments. The descriptor portion includes such information as a version identification number identifying the version of the DOCUMENT format to which the data structure conforms and the identification of the particular program that created the data structure or which last used the data structure. The header portion contains one or more fields for storing such information as a title and the author of the document represented by the data structure, a document version identification and the date of the creation of the data structure. The header portion may also include a field for data which is private to the program that created the data structure or the last program that used the data structure. In addition, the header portion may contain an external references vector which includes a series of one or external references, or pointers to other data structures which are referenced in various segments in the content portion of the data structure.

The content portion of a data structure according to the DOCUMENT format contains, in one or more segments the actual document data, that is, textual, figure and graphical information, which may be formatted and printed to form a book, magazine or similar publication. The segments are nested in a hierarchical form, with one root segment containing zero or more nested segments. Each segment includes a segment header and a segment content portion. The segment header contains attribute information describing the layout and formatting of the text, figures and graphs defined by the content portion of the segment. Each nested segment inherits the formatting and layout attributes of the segment in which it is nested, except for specific attributes which may be defined in a header of a nested segments. A segment header may also defined one or more sets of attribute information, each set being identified by a name, and segments nested therein may inherit a specific set by reference, in its header, to the name.

The segment content portion of a segment may contain data, a pointer to an external reference in the external references vector, and one or more nested segments. A pointer to an external reference in the external references vector indicates that the data in an external source, identified by the external reference, is to be inserted into the location in a printed document corresponding to the position of the pointer.

Figure 3:
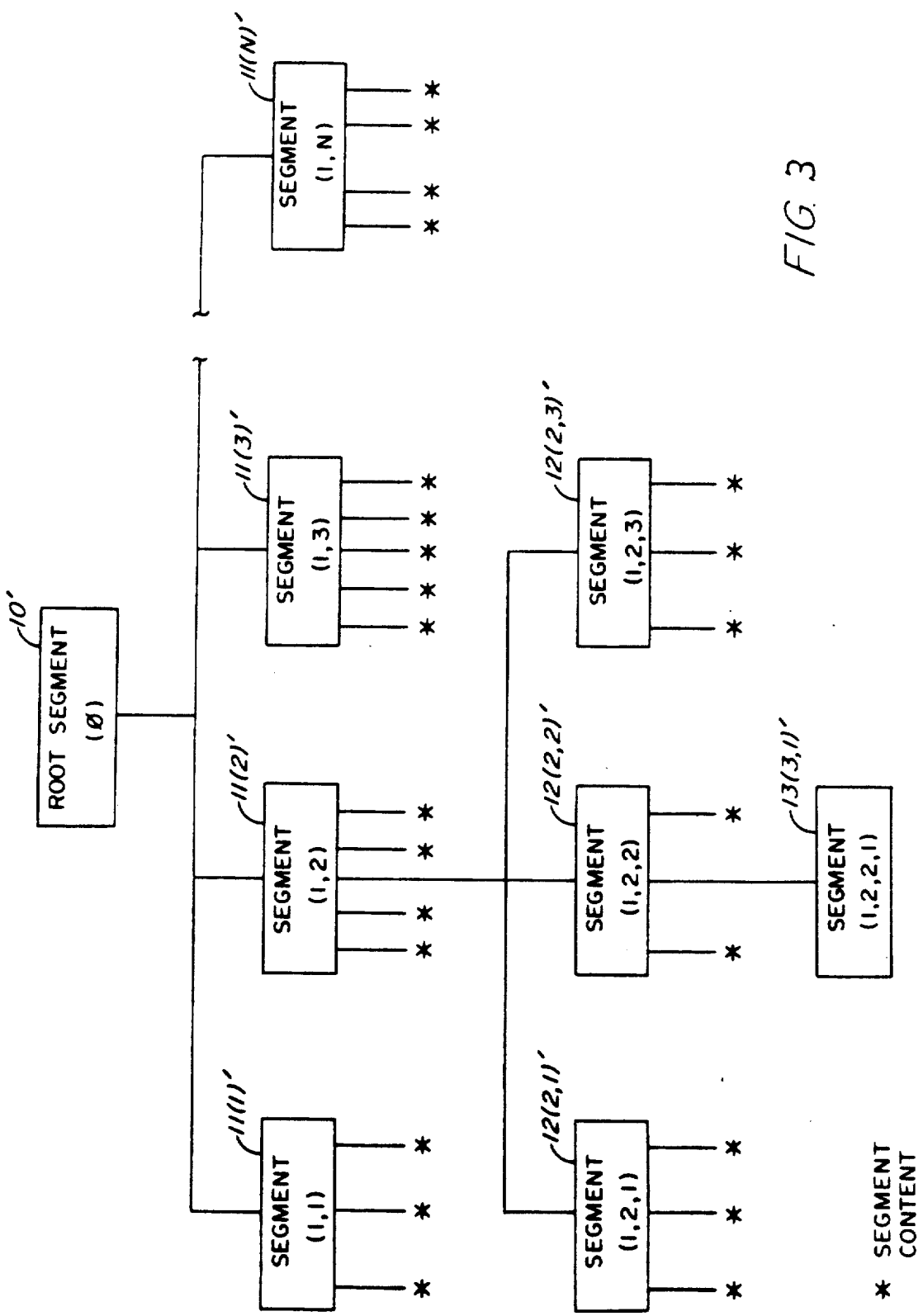
FIG. 3 is a block diagram useful in understanding a data structure for a "DOCUMENT" intermediate data format.

The preferred DOCUMENT data structure will now be described in detail. With reference to FIG. 3, the data structure is organized in a hierarchy of nested segments, each defining a portion of the document. Each segment defines attributes which describe selected predetermined features regarding the information comprising the segment content, with each segment acquiring not only the attributes defined for the specific segment, but also the attributes of its parent segments in the hierarchy.

The hierarchy is defined by a top root segment 10' which contains all of the other segments. Beneath the root segment 10' in the illustrative block diagram depicted in FIG. 3, the root segment 10' is shown as having a plurality of second-level segments 11(1)' through 11(N)' (generally identified by reference numeral 11') thereunder. The second-level segments 11' may also include one or more segments thereunder. In particular, segment 11(2)' is depicted as including three segments, identified as segments 12(2,1)' through 12(2,3)' (generally identified by reference numeral 12'; the first index in each reference numeral identifies the level, under the root level, and the second index in each reference numeral identifies the order of the segment in the sequence at the level), and segment 12(2,2)' is depicted as having a single segment 13(3,1)'.

The sequence of second-level segments 11(1)' through 11(N)' (generally identified by reference numeral 11'), including any segments nested therein, identify the sequence of information contained in the document. The actual content for each segment, which is represented by the asteriks (*) in FIG. 3, represents the sequential documentary textual or graphical contents to be displayed, printed or otherwise processed. If a segment, such as segment 13(3,1)', does not have any child segments and also does not have any indicated content, the segment may reference another segment, either inside the data structure represented by the hierarchy depicted in FIG. 3, or another data source, such as an external reference that may supply the content for the segment. If the external reference defines data, a program using the data structure depicted in FIG. 3 may use the external data directly, or it may call another program associated with the external data, to facilitate processing by the other program of the external data. The calling program may then use the processed data as the segment content.

Figure 4B:
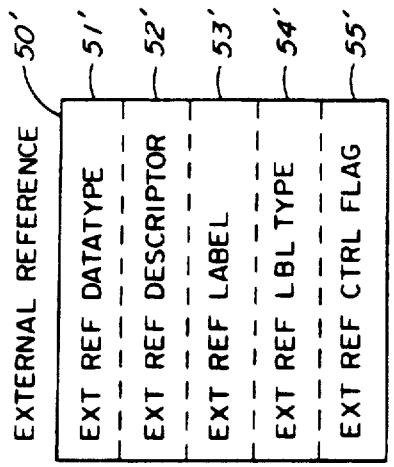
Figure 4A:
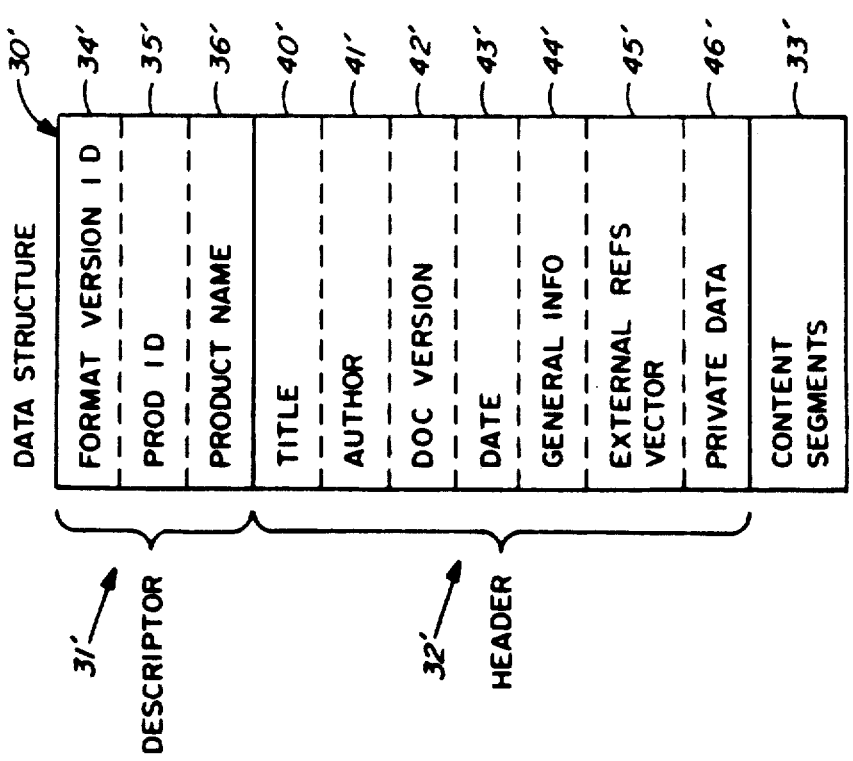

FIGS. 4A through 4D depict in greater detail a data structure in accordance with the invention. With reference to FIG. 4A, a data structure 30' includes three primary portions, including a descriptor portion 31', a header portion 32' and a content segments portion 33'. The descriptor portion 31' includes a plurality of fields, including a format version identification field 34' that identifies a format version for the data structure, a product identification field 35' that receives a product identification value that identifies the product that created the particular data structure 30', and a product name field 36' that receives a human-readable identifier for the product that created the particular data structure. The product identification in field 35' permits a user to select a file comprising the data structure, and the computer control program may use the contents of field 35' to identify the application program that created the structure, call that application program, and enable the application program to use the data structure.

The header portion 32' also includes a plurality of fields, including fields for information such as the data structure's title and another, if any, and the date on which the data structure was created or last modified. All of the fields in the header portion 32' are optional, that is, they are present if the operator who created the document contained in the structure supplies information from which the contents for the particular fields are derived. More specifically, the header portion 32' may include a title field 40', which contains a title, an author field which identifies the author or creator of the document contained in structure 30', a version identification field 42' which receives a document version control number, and a date field 43' which receives a date identifying when the document was created or last modified. In addition, the header portion may include general information control fields 44' which receives such information as the natural language of the document content, and conformance information which identifies the degree to which the document contents conforms to selected standards.

The header portion 32' may also include a private data field 46' in which an application program may store private data. The format for the data structure 30' may be used as an interchange format for facilitating the translation between data structures used by diverse application programs, and the private data field 46' may be used to store data which is otherwise not specified for the data structure 30'. Such data may comprise, for example, formatting information that is recognized by one application program, but perhaps not by other application. This ensures that the formatting and other information is not lost if the data structure 30' is used as an interchange format during a translation operation.

In additon, if the data structure 30' incorporates other data or data structures by reference, the header portion 30' includes an external references vector field 45' which stores an external reference vector, which will be described in further detail below in connection with FIG. 4C. Briefly, the external reference vector 45' includes one or more external reference entries, each identifying an external information that is incorporated by reference into the data structure 30'. A segment in the content segments portion 33' may identify one of the entries in external reference vector, and in processing of the data structure 30', for example during creation of a printed document, the information from the referenced external structure is used to create the portion of the document corresponding to the segment. The external structure may, for example, comprise image data that is inserted, either directly or after a scaling operation, into the printed document. The external structure may also comprise an application program that processes identified data to provide image or other data for inclusion in the printed document. Finally, the external structure may comprise a script that defines a series of processing operations, which may be performed by one or more application programs, to provide the necessary image or other data.

The external references vector may include one or more items 50' whose detailed structure is depicted in FIG. 4B. With reference to FIG. 4B, an item 50' in the external references vector 45' includes a number of fields. In particular, the external reference item 50' includes a reference label field 51' and an external reference descriptor field 52'. The contents of the external reference data type field 51' identifies the data type of the information provided by the externally referenced element. The contents of the external reference descriptor field 52' contain human-readable descriptor of the data type contained in field 51'.

The external reference vector item 50' also includes an external reference label field 53' and an external reference label type field 54'. The external reference label field 53' stores a value that identifies the data structure incorporated by reference. The external reference label type field 54' stores a value that identifies the type of label stored in field 53'. In particular, the reference label field 51' stores a value corresponding to the name of the referenced data structure. In one embodiment, referenced external data structures may comprise files, maintained by the computer's operating system of the computer that created the data structure 30', with each file being named according to a naming convention maintained by the operating system. In addition, external data structures may be stored in a record management system, essentially comprising records maintained by the record management system, with each record being named according to a naming convention maintained by the record management system. The reference label field 51' stores the file or record name of the referenced data structure, and the reference label type field 52' stores a value indicating whether the name is according to the operating system naming convention or the record management system naming convention.

The external reference vector item 50' also includes an external reference control flag 55'. The referenced data structure may be a local data structure or a global data structure, and the reference control field 53' includes a flag whose condition indicates whether the referenced data structure is a local data structure or a global data structure, which may be of interest in connection with transferring the data structure 30' among nodes in, for example, a digital data processing system, as described in U.S. patent application Ser. No. 07/368,681, filed on even date herewith, in the name of Robert L. Travis, et al., entitled Information Object Transport System and incorporated herein by reference.

The data structure 30' also includes a content segments portion 33' which includes a root segment 10' (FIG. 3) that includes one or more second-level segments 11' nested therein, and, as described above, in connection with FIG. 3, second level segments may include third-level segments 12', and so on, to define a hierarchy of segments. The sequential second-level segments 11' define the general sequential portions of the document represented by data in the data structure. Each second-level segment 11' may contain, for example, data representing the text for a paragraph or another identifiable section, such as a chapter, of a document, and a third-level segment may include lower-level portions, such as individual text lines, in which the data in the segment is encoded in, for example, ASCII text, or bit maps depicting the representations of the pixels defining the text. The segment includes layout and other attribute information identifying the layout, in the document, of the data for the segment.

In addition, a segment may comprise an external references vector pointer, which, identifies an entry in the external references vector 45' in heater 32'. If the segment does include such an external references vector pointer, the referenced external structure provides the required data for the segment.

The segment data structure 60', which is the data structure contained in content segments portion 33' for a segment, is defined in FIG. 4C. The content segments portion 33' includes one or more segment data structures 60'. With reference to FIG. 4C, the segment data structure 60' includes a segment header portion 61', a content sequence portion 62' and an end of segment identifier field 63', which receives a value identifying the field as the end of the segment data structure 60'. The segment data structure 60' is thus defined by segment header portion 61' and the end of segment identifier field 63'.

As noted above, the segments may be nested. If one or more segments are nested within another segment, the lower level segments' segment data structures 60' are contained in the content sequence portion 62' of the parent segment's segment data structure 60'.

The segment header portion 61' includes a number of fields. A segment identification field 64' contains a segment identification value. A segment user label field 65' contains a title or other label given to the segment by a user or creator of the segment. A segment attributes field 67' contains, among other information described below, formatting information. The formatting information may be specified in one or more named sets, and segments nested therein may specify one set of attributes by a name which may be provided in a segment type field 66'. By specifying the name in the segment type field 66' of a segment nested in a higher-level, the attributes associated with the name are used in connection with the processing of the segment. to the extent that they are not specified in the segment attributes field of the nested segment. A segment layout field contain layout information describing the layout of the data contained in the segment, such as.

As noted above, the segment attributes field 67' contains such information as the processing and presentation attributes of the segment. The segment attributes field 67' may include a number of fields, generally shown in FIG. 4D, including fields 80' and 81' that may contain such information as, for example, the type of data contained in the segment. that is, whether the segment contains ASCII text data. image data which may be encoded, for example, bitmapped form, or graphics data which may be encoded. for example, by identifying the lines and arcs in the graphical image. The attributes field 67' also indicates whether the data for the segment is in tabular form, or in a well known "Page Description Language" form.

The attributes field 67' also may includes a computed content attributes field 82'. If present. the contents of the content attributes field indicate that the segment content is provided by an identified structure external to the segment. In particular, the content attributes field may contain a predetermined value and segment identifier that indicate that the content of the segment is to provided is to be copied from the segment identified by the segment identifier, and will update the contents of the segment either automatically or on request of an operator using the data structure 30'. If the reference is to an external data structure, the identification of the data structure is by means of an index into the external references vector 45', identifying an item 50' that. in turn, identifies a data structure 30' or data element. When the data structure 30' is processed for, for example, printing, the program controlling the processing may retrieve that referenced data structure and print the data contained therein as belonging to the segment.

Alternatively, the computed content attributes field 82' may contain a predetermined value and variable identifier, which may identify certain variables such as page numbers, chapter and section numbers or footnote numbers in a document. The variable value may comprise that of the most recent time the variable value was modified, or by reference to another value referenced in another, identified. segment.

Finally the computed content attributes field 82' contain a "live link" comprising a function identifier and function parameter or data values. When the data structure 30' is processed for, for example, printing, the program controlling the processing may initiate processing by the function identified by the function identifier, in connection with data and parameters, if any, contained in the content attributes field 82', and print the data provided by the function as belonging to the segment.

The external reference vector 45', and the computed content attributes 82', thus jointly facilitate reference, from within the data structure 30', to external data structures and external functions, which are incorporated into a document which may be printed, for example, from the data structure 30'. The external references vector facilitates identification of external data structures, by reference by index from within a segment. The "live link" comprising the function identifier, parameter and data values in a computed content attributes field 82' also facilitates reference to external functions which may be processed to provide data for a segment. In either case, an operator using a computer program which stores data in a data structure 30' as depicted in FIG. 4A may provide the information for the external references vector 45' and computed content attributes field 82' of the respective segment data structures 60' either directly or symbolically while using the program.

It will be appreciated that the use of the external references vector and "live links" may also be used in data structures that are not segmented. In that case, the data represented by the external data structures identified by the external references vector and the data provided by the functions identified "live links" may be used by the program using the data structure as though existing at the point of the reference, which essentially occurs in the segmented data structure 30' (FIG. 4A).

Figure 5:
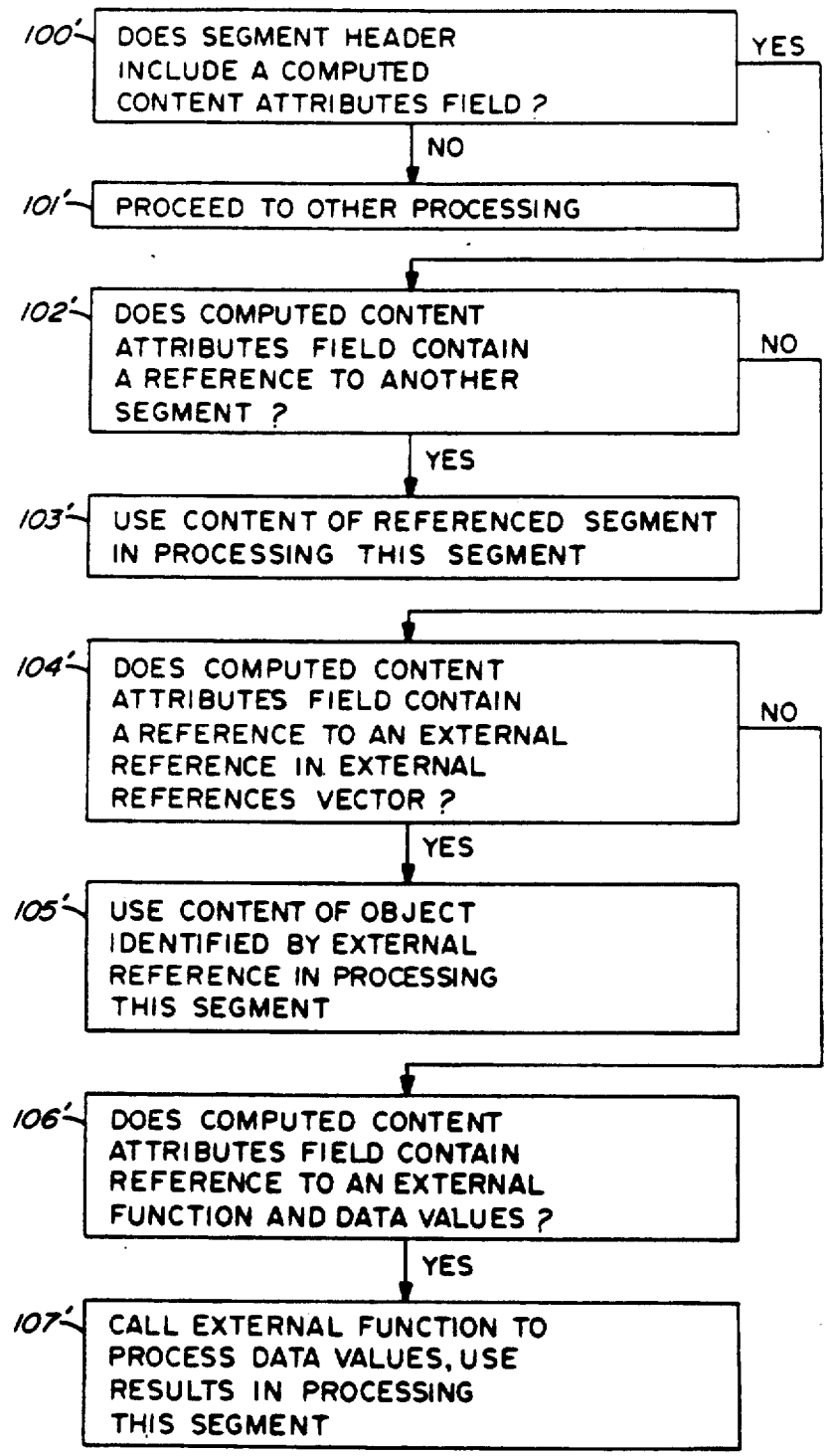
FIG. 5 depicts a flow chart illustrating a selected processing operation in connection with the DOCUMENT data structure.

FIG. 5 depicts a flow chart illustrating how the external reference vector 45' and a computed content attribute 82' in a segment header 61' may be used. With reference to FIG. 5, during processing of the data structure 30' to, for example, generate document data for printing, displaying, and so forth. the processor (not shown) processing the data structure 30' initially determines whether a segment header 61' contains a computed content attributes field 82' (step 100'). If not, the segment data structure 60' contains all of the segment content and does not reference an external structure, and so the processor proceeds to step 101' to process the content of the segment data structure 60'. However, if the processor determines that the segment header 61' does include a computed content attributes field 82', it sequences to a series of steps 102 through 107 to determine the type of computed content attribute in field 82' and perform a processing operation required for the particular type determined.

In step 102. the processor initially determines whether the computed content attributes field contains a reference to another segment in the same data structure 30'. If so, the processor uses the content of the referenced segment data structure 60' in processing this segment data structure 60' (step 103').

If the processor determines in step 102' that the computed content attributes field 82' does not contain a reference to another segment in the same data structure 30', it sequences to step 104' to determine whether it contains a reference to an external reference 50' in the external reference vector 45'. If so, the processor uses the contents of the object identified by the referenced external reference 50' in processing this segment data structure (step 105').

On the other hand. if the processor, in step 104', determines that the computed content attributes field 82' does not contain a reference to an external reference 50' in the external references vector 45', it sequences to step 106' to determine whether it contains a reference to an external function and a set of data values. If so, the processor may enable the external function to be called and processed, using the set of data values, to produce results that are used in processing the segment (step 107').

A data stucture in the TABULAR format also includes three portions, including a descriptor portion, a header portion and a table contents portion. The descriptor portion of the TABULAR format is similar to the descriptor portion of the DOCUMENT format. The header portion of the TABULAR format is also similar to the header portion of the DOCUMENT format, with the addition that the header of a data structure in the TABULAR format may also include a generic columns definition. That is, the header portion of the TABULAR format may include generic columnar information comprising sets of information defining the formatting and layout of columns of tabular data, each set being identified by a name. In addition, the generic columnar information may specify default values to be used if not otherwise provided in table definitions which reference the generic columnar information.

The table contents portion of a data structure in the TABULAR format may contain tabular data in one or more table definitions. Each table definition, in turn, includes a table header, which includes formatting and other information, and tabular data in zero or more cells organized into rows and columns. The table header includes table metadata information, which may include columnar formatting information, value range information, and so forth. The columnar formatting information may reference, by name, a particular set of generic columns information in the header portion of the TABULAR data structure, and thereby inherit, or incorporate, the columnar formatting information defined by that set of generic columns information, to the extent that a particular item of columnar formatting information is not specifically provided in the table definition header. The table definition header also includes window information, which is used to defined formatting and other information for displaying the table on, for example, a video display terminal, and private data which is private to the program that created the data structure or that last updated it.

The tabular data is organized into a plurality of rows, each with a header followed by zero or more cells. The row header includes a row number, program private information, and row formatting information. The row number corresponds to the sequential row number of the row of cells following the row header in the table. Each cell also includes a cell header, which includes a column number, and formatting information, as well as a cell value or expression. The data in each cell may comprise literal data, formulas for computing data values in terms of values in other cells, or pointers to external references in an external reference vector in the data structure's header portion. A row may contain, in the respective cells, values that comprise column header information or legends, and the row header includes a flag that identifies the cell values as such. The preferred TABULAR data structure will now be described in detail. With reference to FIG. 6, a tabular data structure 10" includes three primary portions, including a descriptor portion 11", a header portion 12" and a table contents portion 13". As will be described in greater detail below in connection with FIGS. 10A through 10C, the table contents portion 13" contains, in one or more data structures each representing a table, data representing a table, which comprises an array of cells. Tabular data may be generated by, for example, a spreadsheet program in which data organized in the form of an array of, generally, two or more dimensions. The data stored in cells in a table may comprise literal data, that is, data representing input by an operator or other source, or it may comprise data-representing a formula which defines a cell value in terms of an arithmetic expression with reference to other cells in the table. Alternatively, as described below, data for a cell may be represented or provided by a source external to the tabular data structure 10".

The descriptor portion 11" includes a plurality of fields, including a format version identification field 14" that identifies a format version for the tabular data structure 10", a product identification field 15" that receives a product identification value that indentifies the product that created the particular tabular data structure 10", and a product name field 16" that receives a human-readable identifier for the product that created the particular tabular data structure 10". In addition, a product version field 17" receives a value identifying the version of the product identified in fields 15" and 16" that created the tabular data structure 10". The product identification in field 15" permits a user to select a file comprising the tabular data structure, and the computer control program may use the contents of field 15" to identify the application program that created the structure, call that application program, and enable the application program to use the data structure.

The header portion 12" also includes a plurality of fields, including a field 20" that receives private header information, that is, header information that is generated specifically and uniquely by the application program that generated the tabular data structure 10" and may not be cognizable by other applications which may use the particular tabular data structure 10". In addition, the header portion 12" includes a title field 21" which contains a title for the tabular data structure 10" and a data field 22" which contains a date identifying when the tabular data structure was created or last modified or updated.

In addition, if the tabular data structure 10" incorporates other data or data structures by reference, the header portion 12" includes an external references vector field 23" which stores an external reference vector, which will be described in further detail below in connection with FIG. 8. Briefly, the external reference vector includes one or more external reference entries, each identifying external information that is incorporated by reference into a table or cell in the tabular data structure 10". A table or cell in the table contents portion 13" may identify one of the entries in external reference vector 23", and in processing of the tabular data structure 10", for example during updating of a spreadsheet or creation of a printed table, the information from the referenced external structure is used to create the table or cell referencing, through the external references vector 23", the external data structure.

The header portion also may include a language identification field 24", which contains a value that identifies one or more natural languages which may be contained in text fields in the tabular data structure 10", a language preference table field 25" and generic a column field 26". The natural languages identified in the language identification field 24" may also be used in connection with processing of the data values which may be contained in the table data structure. For example, the identified natural languages may be used to control sorting of data so that the data is sorted according to a language collating sequence. In addition, if data represents money, the identified natural languages may identify currency denominations and thus may be used to control processing of the currency values in the table.

The language preferences field 25", if present, contains one or more language preference items 27", each of which contains information relating to the formatting and processing of the tabular data in the table contents portion 13". In particular, a language preference item 27" includes a language preference index field 28" which is a pointer into a the list of languages contained in language identification field 24" to thereby associate the item with the language, in language identification field 24", identified by the pointer. A language application private data field 29" may contain information that is private to the application that generated the tabular data structure 10" or that last updated its contents. A language presentation attribute items field 30" may contain a list of one or more information formatting items, such as a currency symbol indicator, where the currency symbol is located in relation to the currency value, digit separators and where they are located, and so forth. A language edit strings field 31" may contain such information as how types do data, such as money and telephone numbers, are to be formatted. A collating sequence field 32" may contain a value that identifies a predefined collating or sorting sequence which may identify a predefined collating sequence, and a collating table 33" may specify a customized collating sequence.

The generic columns field 26", which will be described in greater detail below in connection with FIG. 9, details information for processing and displaying columns in the various tables. The generic columns field 26" includes a plurality of entries. As will be described below in connection with FIG. 10B, the table contents portion 13" includes one or more table definitions each of which may, in turn include a metadata portion, which, in turn, includes column entries each of which contains information regarding processing and display of a specific column of data in the table. A column entry in the metadata portion of a table may point to an entry in the generic columns field 26" to, and, if so, the information in the entry in the generic columns field 26" that is not inconsistent with or superseded by the information in the column entries in the metadata portion of the table will be used in processing or dislaying the column of data in the table.

As noted above, the header portion 12" includes an external references vector 23" that identifies sources of data, external to the tabular data structure 10", that are incorporated into tables or cells in the tables in the tables contents portion 13". The external references vector 23" includes a plurality of vector reference elements 34", which is depicted in detial in FIG. 8, each of which contains a plurality of fields that identify an external data structure. The tables and cells that incorporate the external data by reference contain an index into the external references vector 23" identifying a particular vector reference element 34". During processing, printing, or transferring among, for example, nodes or hosts in a distributed digital data processing system of the tabular data structure referencing the vector reference element 34", the application performing the processing, printing, or transferring may obtain the necessary data for the table or cell from the external data structure identified by the element 34". One system for tranferring a tabular data structure 10" containing an external reference vector 23" is described in U.S. patent application Ser. No. 07/368,681, of Robert L. Travis, et al., entitled Information Object Transport System filed on even date herewith.

With reference to FIG. 8, an item 34" in the external references vector 23" includes a number of fields. In particular, the external reference item 34" includes a reference data type field 35" and an external reference descriptor field 36". The contents of the external reference data type field 35" identifies the data type of the information provided by the externally referenced element. The contents of the external reference descriptor field 36" contain human-readable descriptor of the data type contained in field 35".

The external reference vector item 34" also includes an external reference label field 37" and an external reference label type field 38". The external reference lable field 37" stores a value that identifies the data structure incorporated by reference. The external reference label type field 38" stores a value that identifies the type of label stored in field 37". In particular, the reference label field 37" stores a value corresponding to the name of the referenced data structure. In one embodiment, referenced external data structures may comprise files, maintained by the computer's operating systen of the computer that created the tabular data structure 10", with each file being named according to a naming convention maintained by the operating system. In addition, external data structure may be stored in a record management system, essentially comprising records maintained by the record management system, with each record being named according to a naming convention maintained by the record management system. The reference label field 37" stores the file or record name of the referenced data structure, and the reference label type field 38" stores a value indicating whether the name is according to the operating system naming convention or the record management system naming convention. The contents of the external reference label type field 38" thus provide information as to how the contents of the reference label field 37" are to be interpreted or processed.

The external reference vector item 34" also includes an external reference control flag 30". The referenced data structure may be a local data structure or a global data structure. As noted in the aforementioned Information Object Transport System Application U.S. patent application Ser. No. 07/368,681, a tabular data structure may be a global information object, that is, an information object whose names or other identification is unique across all nodes in distributed digital data processing system and which may be accessed by any program or application in any node in the system by reference to the same name or identification. A global information object may be replicated in the various node in the system so that each node includes a copy of the global information object, or alternatively, a global information object may be resident on a single node, and the other nodes may be able to retrieve a copy of it from the node on which is resides by reference to the name of the global information object. On the other hand, a tabular data structure 10" may comprise a local information object so that it may be acccessed by name by an application only on the node in which the local information object resides. The reference control flag field 39" includes a flag whose condition indicates whether the reference data structure is a local data structure or a global data structure.

As described above, the header portion 12 in the tabular data structure also includes a generic columns portion 26" that may contain columnar display and processing information for columns which may be contained in the tables stored in the table contents portion 13". The generic columns portion 26" may include one or more column information items 56", one of which is depicted in detail in FIG. 9, that a table in table contents portion 13" may reference to identify the columnar display and processing information. An application processing the tabular data structure 10" uses the column information in the item 56" in processing or printing the particular table in table contents portion 13" identifying the item 56".

With reference to FIG. 9. a generic columns item 56" includes one or more fields. A column name/identification field 40" may includes a name or other identification for the column. which may be used in the tables in table contents portion 13" to reference the generic columns item 56". A column application private data field 41" may store information private to the particular application that created the tabular data structure 10". A column formats field 42" stores default format information, identifying how a column is to be displayed or printed. A coulmn computed-by field 43" may contain an expression defining how a value for the cells comprising the column is to be computed.

A generic columns item 56" may also include a column default value field 44", which may contain a default value to be used for cells in the column, if the value for the cells are not otherwise specified, and a column missing value field 45" may contain a value denoting a null or missing value for the cells comprising the column. if not otherwise specified. A column header field 46" may contain a text string which is used as a header for the column. A data type field 50" identifies the data type of the data in the cells comprising the column, that is. whether that data is integer or floating type and the precision. and a data length field 51" may identify the number of characters in the data in the cells comprising the column. A scale factor field 52" may identify any scaling of the data contained in the cells in the column, identifying. for example, the location of a decimal point in the data.

Finally, a generic columns item 56" may also include several flags, including an auto-recalculation flag 53" which, if set, indicates that expressions in the cells in the column are to be automatically recomputed whenever a change is made to a variable included in the expression. A read-only flag 54", if set, indicates that the data in the column may not be updated. An annotation flag 55", if set. indicates that the data in the column identifies labels for the rows in a table referencing the generic column 26", rather than data.

As described above. the table contents portion 13" may include one or more tables each defined by a table definition 59". The table definition 59" includes two portions. include a table header portion 60", which stores information concerning the table. and a table rows portion 66", described below in connection with FIG. 10D, which stores the actual table data. The table header portion 60" may include fields 61" and 62" which may contain values identifying, respectively, the maximum number of columns and rows which the table may contain. A private data field 63" contains information private to the application which created the tabular data structure 10". A table metadata field 64", which is described below in connection with FIG. 10B, contains metadata information describing the organization and structure of the table, and a window field 65", which is described below in connection with FIG. 10C, contains windowing information defining the display-specific information for a table.

The table mertadata field 64", which contains data that describes the organization and structure of the table, is depicted in FIG. 10B. With reference to FIG. 10B, the table metadata field 64" includes a table name/identification field 70" that identifies the table defined by table definition 59". A private information field 71" includes information for the particular table that is private to the application which created trhe table definition 59". A table description field may contain information such as the revision history of the table and restriction on its use.

The table metadata field 64" may also contain a flags field 73" that, in turn, may contain a number of flags relating to the use and processing of the data contained in the table rows portion 66" of the table definition 59". For example, an auto-recalculation flag may control whether expressions in the cells in the table rows portion 66" are to be automatically recalculated if the data values referenced thereby are modified, and an auto-resort flag may control whether a sorting operation is to be performed automatically if the data values referenced thereby are modified. A flag also identify whether calculations are to be performed by row, column or otherwise. In addition, a flag may identify whether the data contained in the table is to inherit formatting or display attributes based on precedence by row or column. This generally is applied to formatting by row or column when displayed or printed.

The table metabata field 64" may also contain a default formats field 74" which contains default formats for the rows and columns comprising the table defined by table definition 59", which defines default display or printing format information which may be used unless specific format information is provided in a table columns fields 75" or in the table rows portion 66". The table columns field 75" has a structure similar to that of the generic columns field 26" described above in connection with FIG. 8, except that the table columns field 75" may also include a pointer (not shown) to a generic columns item 56" and column position field (not shown) which identifies the position of the column relative to other columns in the table.

The table metadata field 64" may also include two additional fields. In particular, if values in selected cells are constrained to fall in particular ranges, that information may be inserted into a table ranges field 76". An application processing the tabular data structure 10" may use that information to verify than data values input into the cells are within the ranges specified in the table ranges field 76". Finally, a referenced symbols field 77" may contain a list of symbols which may be referenced in expressions in the contained in cells in the table rows portion 66" of the table definition 59". Symbols may comprise, for example. various mathematical operators which may be used in the particular expressions in the tables, and the expressions may reference the symbols by means of pointers thereto.

As described above, the table header 60" of a table definition 59" also contain a table windows field 65" which describes how the data in the table is to be displayed. The table windows field 65" may define multiple windows, each of which indicates display column widths and format information, whether cells, which may contain titles, are locked in place and do not scroll, an active cell, and so forth. A table window 65" includes a number of fields depicted in FIG. 10C. With reference to FIG. 10C, a table window includes a window name/identification field 80" which contain a name by which a user or application may reference the window. A window application private field 81" may contain information private to the particular application that created the tabular data structure 10". The table windows which may be defined by the table definition 59" may be ordered in importance, or in a particular display order, defining an order in which, for example, a user can cycle through them for selected processing purposes, and a window cardinal number field 82" stores a value identifying the order of the table window 65".

The table windows field 65" may also contain a description field 83" which may contain a textual description of the window, which the user mat reference to identify the window. A window flags field 84" may contain flags that indicate, for example, whether the window is to be active or hidden, that is, not displayed, whether formulas or values in the window are to be hidden or displayed, whether column or row headers are to be displayed, and whether grid lines outlining the particular cells of the tabular array are to be displayed.

A table windows field 65" may also contain additional fields. For example, a default formats field 85" may identify how the daya is to be displayed for a window. A window ranges field 86" specifies information similar to that in the table ranges field 76" in table metadata field 64" (FIG. 10B), which is to be used when the data in the table rows portion 66" is displayed using the particular table window 65". Finally, a window active location field 87" identifies a particular active cell, that is, a particular cell in which a user can input data values, in the table rows portion 66" for the window.

As noted above, the table rows portion 66" (FIG. 10A) contains the actual data for the table defined by the table definition 59". The table rows portion 66" contains data encoded in a series of rows, a portion of one of which is depicted in FIG. 10D. With reference to FIG. 10D, a row in the table rows 66" includes a row header 90" followed by a series of cells 91", one cell being shown in FIG. 10D. The row header generally identifies the row and contains formatting and other information which may be used to control processing of cells contained in the row. In particular, the row header includes a row number field 92" which stores a value identifying the row in the series of rows contained in table rows 66". If a table definition does not have any data for a particular row in a table, there may be no row number field 92" which contains that row number, thereby facilitating packing of the data in the tabular data structure 10". The row number field 92" of a row may be omitted, in which case the row number of the row is a function of the row number of the preceding rows.

Following the row number field 92" in the row header 90", if present, or as the first field in the row header if the row number field 92" is not present, a row application private field 93" stores information which is private to the particular application that originated the tabular data structure 10". A row formats field 94" may contain formatting information for the particular row. If particular formatting information is provided in the row formats field 94", that formatting information supersedes and is used instead of conflicting formatting information which may be present in the window formats field 85" (FIG. 10C), default formats field 74" (FIG. 10B) or generic column information (FIG. 8) that may be pointed to by a columns field 75" (FIG. 10B). Finally, a row flags portion 95" may contain a flag indicating that the contents of the cells comprising the row are for display or annotation purposes, and do not constitute actual data.

Following the row header 90" in table rows portion 66" are the actual cells 91" comprising the row. A cell 91" includes a cell header portion 96", which also contains display and status information, and a cell value/expression field 97", which contains the literal value for the cell, and/or an expression by which the value for the cell can be computed. The cell header includes a cell column number field 100" which identifies the column of the cell; if a cell does not contain any data, a cell may not be present for that particular column, thereby further facilitating packing of the data in the tabular data structure 10". A cell state field 101" identifies the state of the cell, that is, whether the cell, and in particular the cell value/expression field 97", contains valid data.

The cell 91" may also contain a cell description field 102", which, if present, stores a textual description of the contents of the cell, which may be particularly useful if the value if the cell is defined by an expression in the cell value/expression field 97". A cell application private field 103" may store information private to the application which originated the tabular data structure 10", and a cell formats field 104" may contain information for formatting the value, whether literal or computed in response to an expression in the cell value/expression field 97", for the particular cell during display or printing of the tabular data structure 10". If particular formatting information is provided in the cell formats field 104", that formatting information supersedes and is used instead of conflicting formatting information which may be present in the row formats field 94", window formats field 85" (FIG. 10C), default formats field 74" (FIG. 10B) or generic column information (FIG. 8) that may be pointed to by a columns field 75" (FIG. 10B).

The tabular data structure 10" thus provides a data structure in which rows, as well as cells in each row, may be close packed, by use of the row identifiers in row number field 92" and the cell column identifiers in the cell column number field 100". In addition, the tabular data structure 10" facilitates a processing and formatting hierarchy, by providing generic columns information in field 26" (FIG. 6) which may be referenced by the particular table columns 75" for the respective tables. In addition, each table, row and cell may also include formatting information for the particular row and cell.

Figure 11:
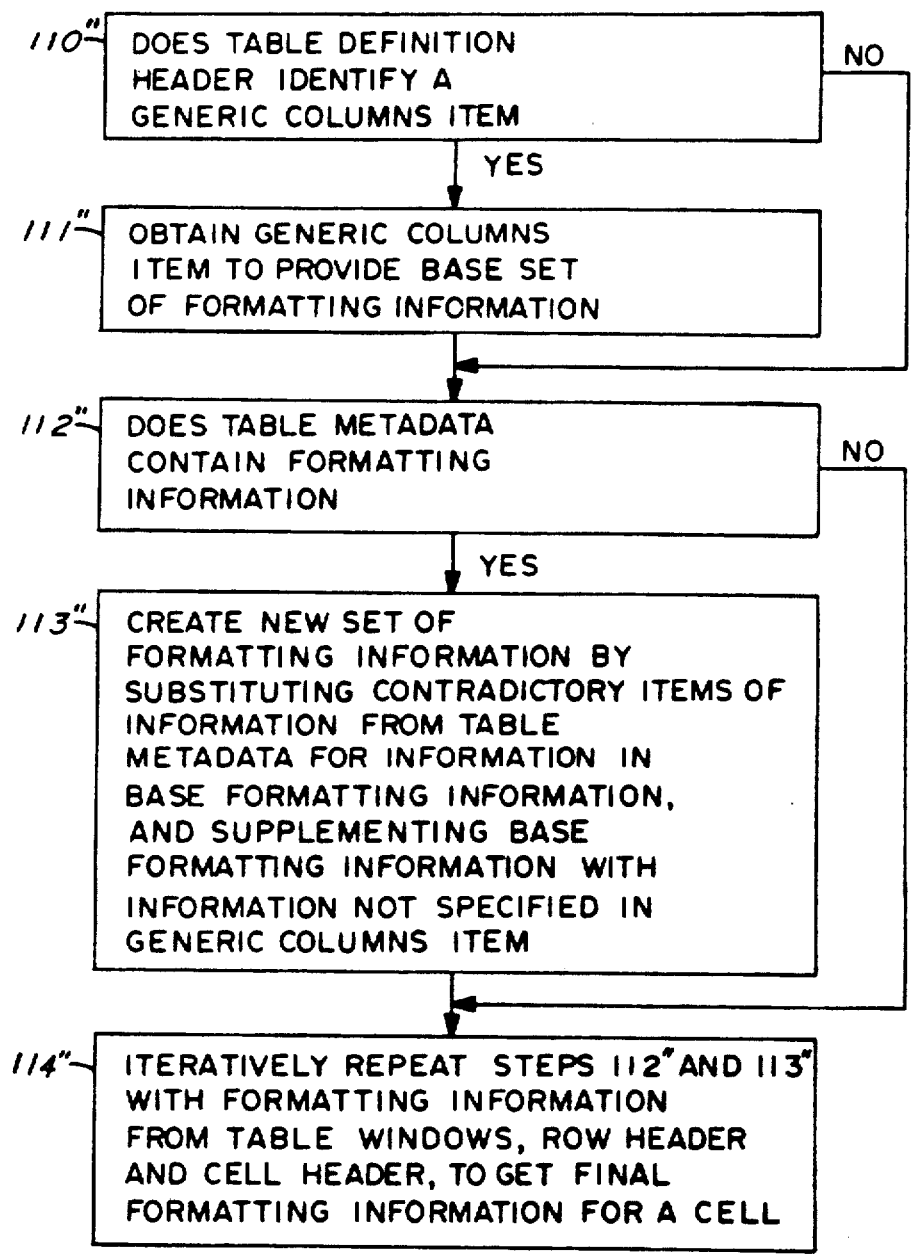
FIG. 11 depicts a flow chart illustrating a selected processing operation in connection with the TABULAR data structure.

FIG. 11 depicts a flow chart illustrating a processing operation using the tabular data structure 10", illustrating the use of the diverse formatting information in the various portions of the tabular data structure 10". A processor (not shown), which processing a table definition for, for example, display or printing, initially determines whether the header 60" of a table definition contains a reference to one or more items 56" in the generic columns field 26" (step 110"). If so, it obtains the item 56" and uses them as base sets for formatting information for identified columns when displaying or printing the table.

Following step 111, or step 110", if the processor determines that the table header does not contain a reference to a generic columns item 56", the processor determines whether the table metadata field 64" contains formatting information for the various columns of the table (step 112"). If so, the processor creates a new set of formatting information for the columns by substituting contradictory formatting information from the table metadata field 64" for the information, if any, from the identified generic columns items 56", and by supplementing it with the information that was not specified in the generic columns item 56" (step 113"). Thus, the formatting information for a column, at the end of step 113", comprises the set for formatting information items in the generic columns item 56", if any, reference by the table definition header 60", to the extent they are not inconsistent with specific formatting information items in the table metadata field 64", plus the formatting information items in the table metadata field 64", if any. The processor then effectively repeats steps 112" and 113" with formatting information from the table windows field 65", the row header 90", and the cell header 96" to obtain the final or composite formatting information for data in a cell.

With this background, the general operation of converting a data structure in the TABULAR format to a data structure in the DOCUMENT format will be described. In this operation, it will be appreciated that the source domain intermediate structure 25 (FIG. 1) will contain the TABULAR data structure, and the $TABULAR_TO_DOCUMENT domain converter will deposit the DOCUMENT data structure that it generates in the target domain intermediate structure 26 (FIG. 1) In performing a conversion, the domain converter $TABULAR_TO_DOCUMENT will initially establish a root aggregate including pointers to the beginning of the descriptor portion, the header portion, and the table contents portion of the TABULAR data structure, similar to that described above for the front end converter 14. The $TABULAR_TO_DOCUMENT domain converter thereafter converts the TABULAR data structure, aggregate by aggregate as described below.

Initially, since the descriptor portion of the TABULAR data structure is substantially similar to that of the DOCUMENT data structure, the $TABULAR_TO_DOCUMENT domain converter, using the pointer thereto in the root aggregate, transfers an aggregate comprising the descriptor portion of the TABULAR data structure from the source domain intermediate data structure 25 to the target domain intermediate data structure 26 as the descriptor portion of the DOCUMENT data structure. Similarly, since the header portion of the TABULAR data structure is substantially similar to that of the DOCUMENT data structure, except for the generic columns information, the $TABULAR_TO_DOCUMENT domain converter transfers the header portion, except for the generic columns information, of the TABULAR data structure from the source domain intermediate data structure 25 to the target domain intermediate data structure 26 as the descriptor portion of the DOCUMENT data structure. The $TABULAR_TO_DOCUMENT domain converter reserves the generic columns information for use in generating the contents portion of the DOCUMENT data structure in the target domain intermediate data structure 26.

Thereafter, the $TABULAR_TO_DOCUMENT domain converter generates the contents portion of the DOCUMENT data structure in the target domain intermediate data structure 26. The $TABULAR_TO_DOCUMENT domain converter initially generates a root segment, including a root segment header that it stores in the target domain intermediate data structure 26. The root segment header includes named sets of layout and formatting information, such as tab setting and indentation information, column width information, and so forth, that the $TABULAR_TO_DOCUMENT domain converter generates using the generic columns information which it reserved during processing the header portion of the TABULAR data structure. Thereafter, the $TABULAR_TO_DOCUMENT domain converter processes the sequential table definitions in the TABULAR data structure to generate sequential segments in the content portion of the root segment in the DOCUMENT data structure.

For each of the table definitions in the source domain intermediate data structure 25, the $TABULAR_TO_DOCUMENT domain converter initially generates a segment (identified as a "table segment"), nested within the root segment, for the table definition for storage in the target domain intermediate data structure 26. The $TABULAR_TO_DOCUMENT domain converter uses the formatting and layout information in the table metadata and table windows portions of the table definition to generate the formatting and layout information for the segment header of the table segment.

After generating the segment header for a table definition, the $TABULAR_TO_DOCUMENT domain converter generates segments for each of the rows, if any, (identified as the "row segment") of the table defined by the table definition, as the segment content for the table segment. The row segment also includes a header, in which the $TABULAR_TO_DOCUMENT domain converter stores formatting and layout information, which it obtains from the row header of the corresponding row in the source domain intermediate data structure 25. The row segment also contains a row segment content portion that includes the cell values. In creating the row segment content portion, if all of the cells have the same layout and formatting attributes as set forth in the row segment header, the $TABULAR_TO_DOCUMENT domain converter may simply identify the cell values in the row segment content portion of the target domain intermediate data structure 26 as obtained from the cells of the table definition in the source domain intermediate data structure 25. On the other hand, if the cells have differing layout and formatting attributes, the $TABULAR_TO_DOCUMENT domain converter may establish separate cell segments for the cells, including formatting and layout information for each cell segment. The $TABULAR_TO_DOCUMENT domain converter may include the various sets of formatting and layout information for the various cells in the row, along with an identifying name, in the formatting and layout information in the row header, and the cell segment headers for the various cell segments may, by reference to the name, indicate that a particular set of formatting and layout information is to be used for that cell segment. The $TABULAR_TO_DOCUMENT domain converter may iteratively repeat the above-described operations for each of the table definitions in the source domain intermediate data structure 25 to generate a DOCUMENT data structure in the target domain intermediate data structure 26.

It will be appreciated that the various portions, in particular the command source 12, the converter executive 11, the front end converter 14, the back end converter 15 and the domain converter 24 all may comprise special-purpose apparatus, or they may comprise computer programs executed by a general purpose computer.

The foregoing description has been limited to a specific embodiment of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed as new and desired to be secured by Letters Patent of the United States is:

1. A data structure format conversion system comprising:
    a front end converter for converting a source data structure in a source data format to a source domain intermediate structure;
    a domain converter for converting the source domain intermediate structure to a target domain intermediate structure;
    said domain converter including a domain conversion activation portion for establishing the domain converter as an intermediary when domain conversion is required between a selected front end converter and a selected back end converter;
    a back end converter for converting the target domain intermediate structure to a target data structure in a target data format; and
    a converter executive for controlling the front end converter, the domain converter, and the back end converter to effect a conversion from the source data structure in the source format to the target data structure in the target data format.

2. The data structure format conversion system as claimed in claim 1, wherein the converter executive further comprises:
    a converter selection portion for selecting a front end converter from a plurality of front end converters, and for selecting a back end converter from a plurality of back end converters.

3. The data structure format conversion system as claimed in claim 1 in which the back end converter operates iteratively in connection with sequential portions of the source data structure, the back end converter iteratively generating data requests which enable the converter executive to, in turn, enable the front end converter to perform a conversion operation in connection with a next sequential portion of the source data structure.

4. The data structure format conversion system as claimed in claim 3 in which the back end converter further generates position requests, and the converter executive enables the front end converter to generate position information in response to the position requests.

5. A data structure format conversion system comprising:
    a plurality of front end converters for converting respective source data structures in respective source data formats to intermediate data structures, at least one of said front end converters converting to a first intermediate data structure, and at least another of said front end converters converting to a second intermediate data structure;
    a domain converter for converting the first intermediate data structure to the second intermediate data structure, and for converting the second intermediate data structure to the first intermediate data structure;
    a plurality of back end converters for converting the intermediate data structures to respective target data structures in respective target data formats, at least one of said back end converters converting from the first intermediate data structure and at least another of said back end converters converting from the second intermediate data structure; and
    a converter executive for effecting a conversion from a specified one of the source data structures to a specified one of the target data structures, said converter executive including a converter selecting portion for selecting a front end converter converting from the specified one of the source data structures and selecting a back end converter converting to the specified one of the target data structures, an intermediary selection portion for determining whether the format provided by the selected front end converter corresponds to the format required by the selected back end converter, an intermediate data structure portion for establishing for data transfer the intermediate data structure having the format provided by the selected front end converter and required by the selected back end converter when the intermediary selection portion determines that the format provided by the selected front end converter is the same as the format required by the selected back end converter, and a domain activation portion for activating the domain converter as an intermediary between the selected front end converter and the selected back end converter when the intermediary selection portion determines that the format provided by the selected front end converter is not the same as the format required by the selected back end converter.

6. The data structure format conversion system as claimed in claim 5 in which the selected back end converter operates iteratively in connection with sequential portions of the source data structure, and the back end converter iteratively generates data requests which enable the converter executive to, in turn, enable the selected front end converter to perform a conversion operation in connection with a next sequential portion of the source data structure.

7. The data structure format conversion system as claimed in claim 5 in which the selected back end converter further generates position requests, and the converter executive enables the front end converter to generate position information in reponsive to the position requests.

8. The data structure format conversion system as claimed in claim 5 in which the first intermediate data structure is a document data structure, and the second intermediate data structure is a tabular data structure.

9. A method of operating a digital computer system for converting a source data structure in a specified source data format to a target data structure in a specified target data format; said digital computer system having a plurality of front end converters for converting respective source data structures in respective source data formats to intermediate data structures, at least one of said front end converters converting to a first intermediate data structure, and at least another of said front end converters converting to a second intermediate data structure; said digital computer system also having a domain converter for converting the first intermediate data structure to the second intermediate data structure, and for converting the second intermediate data structure to the first intermediate data structure; said digital computer system also having a plurality of back end converters for converting the intermediate data structures to respective target data structures in respective target data formats, at least one of said back end converters converting from the first intermediate data structure and at least another of said back end converters converting from the second intermediate data structure; said method comprising the steps of:

selecting a front end converter converting from the specified one of the source data structures and selecting a back end converter converting to the specified one of the target data structures;

determining whether the format provided by the selected front end converter corresponds to the format required by the selected back end converter;

establishing for data transfer the intermediate data structure having the format provided by the selected front end converter and required by the selected back end converter when the format provided by the selected front end converter is the same as the format required by the selected back end converter; and acitivating the domain converter as an intermediary between the selected front end converter and the selected back end converter when the format provided by the selected front end converter is not the same as the format required by the selected back end converter.

10. The method of operating a digital computer system as claimed in claim 9, wherein the selected back end converter is operated iteratively in connection with sequential portions of the source data structure, the selected back end converter iteratively generates data requests, and the selected front end converter performs a conversion operation in connection with a next sequential portion of the source data structure in response to each of said data requests.

11. The method of operating a digital computer system as claimed in claim 10, wherein the back end converter further generates position requests, and wherein the method further comprises enabling the front end converter to generate position information in response to the position requests.

12. The method of operating the digital computer system as claimed in claim 9, wherein the first intermediate data structure is a document data structure, and the second intermediate data structure is a tubular data structure.

* * * * *